United States Patent
Takiguchi et al.

(10) Patent No.: US 7,386,242 B2
(45) Date of Patent: Jun. 10, 2008

(54) IMAGE FORMING APPARATUS

(75) Inventors: Toshiki Takiguchi, Yamatokoriyama (JP); Tatsuya Inoue, Nara (JP); Kouji Wakamoto, Nara (JP); Shiro Narikawa, Kashihara (JP)

(73) Assignee: Sharp Kabushiki Kaisha, Osaka (JP)

( * ) Notice: Subject to any disclaimer, the term of this patent is extended or adjusted under 35 U.S.C. 154(b) by 392 days.

(21) Appl. No.: 11/315,738

(22) Filed: Dec. 22, 2005

(65) Prior Publication Data

US 2006/0140654 A1 Jun. 29, 2006

(30) Foreign Application Priority Data

Dec. 28, 2004 (JP) ............... 2004-381738

(51) Int. Cl.
*G03G 15/00* (2006.01)

(52) U.S. Cl. .................................... 399/45; 358/538

(58) Field of Classification Search ............. 399/45; 358/538
See application file for complete search history.

(56) References Cited

U.S. PATENT DOCUMENTS

2006/0152743 A1* 7/2006 Yoshida ............. 358/1.5
2006/0159498 A1* 7/2006 Takiguchi et al. .......... 399/388
2006/0182477 A1* 8/2006 Takiguchi et al. .......... 399/396

FOREIGN PATENT DOCUMENTS

| JP | 03-101769 | 4/1991 |
|----|-----------|--------|
| JP | 09-068874 | 3/1997 |
| JP | 11-157123 | 6/1999 |
| JP | 2004-219907 | 8/2004 |

* cited by examiner

*Primary Examiner*—David M Gray
*Assistant Examiner*—Ryan D. Walsh
(74) *Attorney, Agent, or Firm*—Renner, Otto, Boisselle & Sklar, LLP

(57) ABSTRACT

An image forming apparatus of the present invention predicts the occurrence of an image elongation, in other words, predicts that an image transferred is lengthened on a sheet due to slipping of the sheet with respect to a photoreceptor at a transfer nip portion. If the occurrence of the image elongation is predicted, the amount of a rear edge portion to be deleted from an electrostatic latent image is obtained on the basis of a sheet rear edge void setting change table, the amount of the rear edge portion to be deleted is added to the default amount of a rear edge void, a portion corresponding to the rear edge portion of an image of image information is deleted, and a printing process is carried out. In this way, even if a slip phenomenon occurs, in other words, the sheet slips with respect to the photoreceptor, it is possible to surely secure a blank space at a rear edge portion of the sheet.

18 Claims, 17 Drawing Sheets

FIG. 7

| SHEET SIZE \ PRINTING RATIO | 0~10% | ~20% | ~30% | ~40% | ~50% | ~60% | ~70% | ~80% | ~90% | ~100% |
|---|---|---|---|---|---|---|---|---|---|---|
| POSTCARD SIZE OR SMALLER | DEFAULT | | | | | | | | | |
| B5 OR SMALLER | DEFAULT | | | | | | | | | |
| A4 HORIZONTAL FEED | DEFAULT | | | | | | | | | |
| A4 VERTICAL FEED | DEFAULT | | | | | | | CUT 1.0 mm OF REAR EDGE IN PRINT IMAGE TO OBTAIN WHITE PORTION | | |
| B4 | DEFAULT | | | | | CUT 1.0 mm OF REAR EDGE IN PRINT IMAGE TO OBTAIN WHITE PORTION | | CUT 2.0 mm OF REAR EDGE IN PRINT IMAGE TO OBTAIN WHITE PORTION | | |
| A3 | DEFAULT | | | | CUT 1.0 mm OF REAR EDGE IN PRINT IMAGE TO OBTAIN WHITE PORTION | CUT 2.0 mm OF REAR EDGE IN PRINT IMAGE TO OBTAIN WHITE PORTION | | CUT 3.0 mm OF REAR EDGE IN PRINT IMAGE TO OBTAIN WHITE PORTION | | |
| A3 OR LARGER | DEFAULT | | | CUT 1.0 mm OF REAR EDGE IN PRINT IMAGE TO OBTAIN WHITE PORTION | | CUT 2.0 mm OF REAR EDGE IN PRINT IMAGE TO OBTAIN WHITE PORTION | | CUT 3.0 mm OF REAR EDGE IN PRINT IMAGE TO OBTAIN WHITE PORTION | | |

FIG. 8

| SHEET SIZE \ PRINTING RATIO | 0~10% | ~20% | ~30% | ~40% | ~50% | ~60% | ~70% | ~80% | ~90% | ~100% |
|---|---|---|---|---|---|---|---|---|---|---|
| POSTCARD SIZE OR SMALLER | DEFAULT | | | | | | | | | |
| B5 OR SMALLER | DEFAULT | | | | | | | | | |
| A4 HORIZONTAL FEED | DEFAULT | | | | | | | | | |
| A4 VERTICAL FEED | DEFAULT | | | | | | | | CUT 1.0 mm OF REAR EDGE IN PRINT IMAGE TO OBTAIN WHITE PORTION | |
| B4 | DEFAULT | | | | | | | CUT 1.0 mm OF REAR EDGE IN PRINT IMAGE TO OBTAIN WHITE PORTION | | |
| A3 | DEFAULT | | | | | CUT 1.0 mm OF REAR EDGE IN PRINT IMAGE TO OBTAIN WHITE PORTION | | CUT 2.0 mm OF REAR EDGE IN PRINT IMAGE TO OBTAIN WHITE PORTION | | CUT 3.0 mm OF REAR EDGE IN PRINT IMAGE TO OBTAIN WHITE PORTION |
| A3 OR LARGER | DEFAULT | | | | CUT 1.0 mm OF REAR EDGE IN PRINT IMAGE TO OBTAIN WHITE PORTION | | CUT 2.0 mm OF REAR EDGE IN PRINT IMAGE TO OBTAIN WHITE PORTION | | CUT 3.0 mm OF REAR EDGE IN PRINT IMAGE TO OBTAIN WHITE PORTION | |

FIG. 11

| SHEET SIZE \ PRINTING RATIO | 0~10% | ~20% | ~30% | ~40% | ~50% | ~60% | ~70% | ~80% | ~90% | ~100% |
|---|---|---|---|---|---|---|---|---|---|---|
| POSTCARD SIZE OR SMALLER | DEFAULT | | | | | | | | | |
| B5 OR SMALLER | DEFAULT | | | | | | | | | |
| A4 HORIZONTAL FEED | DEFAULT | | | | | | | | | |
| A4 VERTICAL FEED | DEFAULT | | | | | CUT 1.0 mm OF REAR EDGE IN PRINT IMAGE TO OBTAIN WHITE PORTION | | CUT 2.0 mm OF REAR EDGE IN PRINT IMAGE TO OBTAIN WHITE PORTION | | |
| B4 | DEFAULT | | | CUT 1.0 mm OF REAR EDGE IN PRINT IMAGE TO OBTAIN WHITE PORTION | | CUT 2.0 mm OF REAR EDGE IN PRINT IMAGE TO OBTAIN WHITE PORTION | | CUT 3.0 mm OF REAR EDGE IN PRINT IMAGE TO OBTAIN WHITE PORTION | | |
| A3 | DEFAULT | | CUT 1.0 mm OF REAR EDGE IN PRINT IMAGE TO OBTAIN WHITE PORTION | | CUT 2.0 mm OF REAR EDGE IN PRINT IMAGE TO OBTAIN WHITE PORTION | | CUT 3.0 mm OF REAR EDGE IN PRINT IMAGE TO OBTAIN WHITE PORTION | | | |
| A3 OR LARGER | DEFAULT | CUT 1.0 mm OF REAR EDGE IN PRINT IMAGE TO OBTAIN WHITE PORTION | | CUT 2.0 mm OF REAR EDGE IN PRINT IMAGE TO OBTAIN WHITE PORTION | | | CUT 3.0 mm OF REAR EDGE IN PRINT IMAGE TO OBTAIN WHITE PORTION | | | |

FIG. 12

| SHEET SIZE \ PRINTING RATIO | 0~10% | ~20% | ~30% | ~40% | ~50% | ~60% | ~70% | ~80% | ~90% | ~100% |
|---|---|---|---|---|---|---|---|---|---|---|
| POSTCARD SIZE OR SMALLER | DEFAULT | | | | | | | | | |
| B5 OR SMALLER | DEFAULT | | | | | | | | | |
| A4 HORIZONTAL FEED | DEFAULT | | | | | | | | | |
| A4 VERTICAL FEED | DEFAULT | | | | | | CUT 1.0 mm OF REAR EDGE IN PRINT IMAGE TO OBTAIN WHITE PORTION | | | CUT 2.0 mm OF REAR EDGE IN PRINT IMAGE TO OBTAIN WHITE PORTION |
| B4 | DEFAULT | | | | CUT 1.0 mm OF REAR EDGE IN PRINT IMAGE TO OBTAIN WHITE PORTION | | | CUT 2.0 mm OF REAR EDGE IN PRINT IMAGE TO OBTAIN WHITE PORTION | | |
| A3 | DEFAULT | | | CUT 1.0 mm OF REAR EDGE IN PRINT IMAGE TO OBTAIN WHITE PORTION | | CUT 2.0 mm OF REAR EDGE IN PRINT IMAGE TO OBTAIN WHITE PORTION | | CUT 3.0 mm OF REAR EDGE IN PRINT IMAGE TO OBTAIN WHITE PORTION | | |
| A3 OR LARGER | DEFAULT | | CUT 1.0 mm OF REAR EDGE IN PRINT IMAGE TO OBTAIN WHITE PORTION | | CUT 2.0 mm OF REAR EDGE IN PRINT IMAGE TO OBTAIN WHITE PORTION | | CUT 3.0 mm OF REAR EDGE IN PRINT IMAGE TO OBTAIN WHITE PORTION | | | |

FIG. 13

| SHEET SIZE \ PRINTING RATIO | 0~10% | ~20% | ~30% | ~40% | ~50% | ~60% | ~70% | ~80% | ~90% | ~100% |
|---|---|---|---|---|---|---|---|---|---|---|
| POSTCARD SIZE OR SMALLER | DEFAULT | | | | | | | | | |
| B5 OR SMALLER | DEFAULT | | | | | | | | | |
| A4 HORIZONTAL FEED | DEFAULT | | | | | | | | | |
| A4 VERTICAL FEED | DEFAULT | | | | | | | | CUT 1.0 mm OF REAR EDGE IN PRINT IMAGE TO OBTAIN WHITE PORTION | |
| B4 | DEFAULT | | | | | | CUT 1.0 mm OF REAR EDGE IN PRINT IMAGE TO OBTAIN WHITE PORTION | CUT 1.0 mm OF REAR EDGE IN PRINT IMAGE TO OBTAIN WHITE PORTION | CUT 1.0 mm OF REAR EDGE IN PRINT IMAGE TO OBTAIN WHITE PORTION | CUT 2.0 mm OF REAR EDGE IN PRINT IMAGE TO OBTAIN WHITE PORTION |
| A3 | DEFAULT | | | | CUT 1.0 mm OF REAR EDGE IN PRINT IMAGE TO OBTAIN WHITE PORTION | CUT 1.0 mm OF REAR EDGE IN PRINT IMAGE TO OBTAIN WHITE PORTION | CUT 2.0 mm OF REAR EDGE IN PRINT IMAGE TO OBTAIN WHITE PORTION | CUT 2.0 mm OF REAR EDGE IN PRINT IMAGE TO OBTAIN WHITE PORTION | CUT 2.0 mm OF REAR EDGE IN PRINT IMAGE TO OBTAIN WHITE PORTION | CUT 3.0 mm OF REAR EDGE IN PRINT IMAGE TO OBTAIN WHITE PORTION |
| A3 OR LARGER | DEFAULT | | | CUT 1.0 mm OF REAR EDGE IN PRINT IMAGE TO OBTAIN WHITE PORTION | CUT 1.0 mm OF REAR EDGE IN PRINT IMAGE TO OBTAIN WHITE PORTION | CUT 2.0 mm OF REAR EDGE IN PRINT IMAGE TO OBTAIN WHITE PORTION | CUT 2.0 mm OF REAR EDGE IN PRINT IMAGE TO OBTAIN WHITE PORTION | CUT 2.0 mm OF REAR EDGE IN PRINT IMAGE TO OBTAIN WHITE PORTION | CUT 3.0 mm OF REAR EDGE IN PRINT IMAGE TO OBTAIN WHITE PORTION | CUT 3.0 mm OF REAR EDGE IN PRINT IMAGE TO OBTAIN WHITE PORTION |

FIG. 14

| PRINTING RATIO / SHEET SIZE | 0~10% | ~20% | ~30% | ~40% | ~50% | ~60% | ~70% | ~80% | ~90% | ~100% |
|---|---|---|---|---|---|---|---|---|---|---|
| POSTCARD SIZE OR SMALLER | DEFAULT | | | | | | | | | |
| B5 OR SMALLER | DEFAULT | | | | | | | | | |
| A4 HORIZONTAL FEED | DEFAULT | | | | | | | | | |
| A4 VERTICAL FEED | DEFAULT | | | | | | | | CUT 1.0 mm OF REAR EDGE IN PRINT IMAGE TO OBTAIN WHITE PORTION | |
| B4 | DEFAULT | | | | | | | CUT 1.0 mm OF REAR EDGE IN PRINT IMAGE TO OBTAIN WHITE PORTION | | |
| A3 | DEFAULT | | | | CUT 1.0 mm OF REAR EDGE IN PRINT IMAGE TO OBTAIN WHITE PORTION | | | CUT 2.0 mm OF REAR EDGE IN PRINT IMAGE TO OBTAIN WHITE PORTION | | CUT 3.0 mm OF REAR EDGE IN PRINT IMAGE TO OBTAIN WHITE PORTION |
| A3 OR LARGER | DEFAULT | | | | CUT 1.0 mm OF REAR EDGE IN PRINT IMAGE TO OBTAIN WHITE PORTION | | | CUT 2.0 mm OF REAR EDGE IN PRINT IMAGE TO OBTAIN WHITE PORTION | | CUT 3.0 mm OF REAR EDGE IN PRINT IMAGE TO OBTAIN WHITE PORTION |

IMAGE FORMING APPARATUS

This Nonprovisional application claims priority under 35 U.S.C. § 119(a) on Patent Application No. 381738/2004 filed in Japan on Dec. 28, 2004, the entire contents of which are hereby incorporated by reference.

FIELD OF THE INVENTION

The present invention relates to an image forming apparatus which visualizes an electrostatic latent image formed on an electrostatic latent image bearing member, so as to form a visible image, and then transfers the visible image to a recording material while conveying the recording material.

BACKGROUND OF THE INVENTION

An image forming apparatus causes a writing device to form on a photoreceptor (electrostatic latent image bearing member) an electrostatic latent image based on image information, and visualizes the electrostatic latent image with a toner (developer) so as to form a toner image (visible image). Then, a transfer device transfers the toner image from the photoreceptor to a sheet that is a recording material.

In the case in which the transfer device is a transfer roller, the toner image is transferred to the sheet by (i) supplying the sheet to a transfer nip portion where the photoreceptor and the transfer roller are compressed against each other, and (ii) conveying the sheet (recording material) by rotational forces of the photoreceptor and the transfer roller. Because a transfer voltage is applied to the transfer roller, the sheet passing through the transfer nip portion is electrically charged by the transfer voltage. Therefore, the toner on the photoreceptor is absorbed by the sheet.

Incidentally, a peripheral velocity of the transfer roller is higher than that of the photoreceptor. Therefore, the sheet once sticks to the photoreceptor, but is pulled due to the difference in peripheral velocity between the photoreceptor and the transfer roller. Thus, the sheet is separated from the photoreceptor. This arrangement is made to avoid deterioration in printing quality, such as hollow characters and half-tone thin dots caused due to a separation discharge generated when the sheet is separated from the transfer nip portion.

That is, the transfer voltage is applied to the transfer roller to transfer the toner to the sheet, however it is no exaggeration to say that a portion where the transfer voltage works normally is the transfer nip portion. Therefore, a white portion (that is, a portion on which the toner is not deposited) on the surface (close to the photoreceptor) of the sheet at the transfer nip portion is electrically charged with a high potential. On this account, when the sheet is separated from the transfer nip portion, the separation discharge is generated between the white portion of the sheet and a high potential portion on the photoreceptor. Due to the separation discharge, some of the toner transferred to the sheet is reversely transferred to the photoreceptor. This causes the above-described deterioration in printing quality.

In front of the transfer nip portion, a sheet conveying roller, called an idle roller, is provided. The sheet conveying roller rotates at substantially the same peripheral velocity as the transfer roller. As shown in FIGS. 17(a) to 17(d), a sheet P conveyed by an idle roller 116 is conveyed to a contact point of a transfer nip portion 127 in such a direction that the front edge of the sheet P proceeds toward an outer circumference of the photoreceptor 121. After the front edge of the sheet P first contacts with the photoreceptor 121, the sheet P is conveyed to the transfer nip portion 127 by the rotation of the photoreceptor 121.

If the front edge of the sheet P directly contacts with the contact point of the transfer nip portion 127, the sheet P vibrates at the moment of the front edge of the sheet P entering to the transfer nip portion 127. This vibration may cause a print slur (image deviation, transfer deviation) and/or a paper cockle at the front edge of the sheet P.

Further, in front of the transfer nip portion 127, a bended portion 128 of the sheet P is formed as shown in FIG. 17(d). The bended portion 128 is formed by substantially equalizing the peripheral velocity of the idle roller 116 and the peripheral velocity of a transfer roller 125. By forming the bended portion 128 in front of the transfer nip portion 127, the sheet P is conveyed to the transfer nip portion 127 in a state in which the sheet P surely sticks to the surface of the photoreceptor 121. Therefore, it is possible to prevent the problem in which, before the sheet P reaches the transfer nip portion 127, the sheet P sticks to the surface of the transfer roller 125 so as to be charged unnecessarily. Excessive charge to the sheet causes the above-described phenomenon of reversely transferring the toner.

By the bended portion 128 which intends to be flat, the sheet P is pushed in a direction in which the sheet P is conveyed. Therefore, the amount of the bended portion 128 is adjusted so that slipping of the sheet P is avoided by a nip pressure of the transfer nip portion 127.

Moreover, in recent years, a particle diameter of the toner for visualizing the electrostatic latent image has been reduced due to an increase in resolution of the image information. Conventionally, the particle diameter of the toner is substantially in a range from 8 $\Phi\mu m$ to 12 $\Phi\mu m$. However, in recent years, the particle diameter of the toner is substantially in a range from 4 $\Phi\mu m$ to 7 $\Phi\mu m$. In the case of a small-particle toner used in recent years, even if large particles and fine particles are removed in a manufacturing step, crushing occurs due to friction at the time of frictional electrification that is the application of electric charge to the toner. Therefore, the toner whose particle diameter is 2 $\Phi\mu m$ or less also contributes to an image development.

Conventionally, the image forming apparatus forcibly omits a signal corresponding to a sheet peripheral edge portion determined by the image forming apparatus, from an image signal supplied from a terminal device such as a host computer, so as to form a blank space.

If the above omission is not carried out in the case of recording on the entire sheet the image based on the image signal supplied from the terminal device, the toner corresponding to the sheet peripheral edge portion of the toner image on the photoreceptor is not transferred, and the toner remains on the photoreceptor. Then, the remaining toner scatters inside the image forming apparatus. This causes deterioration in image quality and/or a jam.

With regard to such a technique for forcibly forming the blank space, for example, Japanese Unexamined Patent Publication No. 101769/1991 (Tokukaihei 3-101769, published on Apr. 26, 1991) discloses a technique for separately changing the size of each blank space corresponding to each edge of a sheet when images are formed on the same sheet twice. Even if an error in a tolerance range occurs, an image can be prevented from sticking out, and it is possible to increase a region which can be utilized effectively for image formation.

Moreover, Japanese Unexamined Patent Publication No. 068874/1997 (Tokukaihei 9-068874, published on Mar. 11, 1997) discloses a technique in which, after a first test pattern (a solid image having a small blank space at a rear edge) is outputted and an image whose rear edge portion is blurred is obtained, a second test pattern having a normal blank space at a rear edge is outputted and the blank space at the rear edge is adjusted so as to correct the blur at the rear edge portion of the image. With this, it is possible to prevent the damage caused by the transfer charge (transfer electric field) to the image carrier (photoreceptor), and also possible to obtain the image of high quality.

However, since the particle diameter of the toner has been reduced these days, there occur problems which had not occurred in the past. That is, the problem is a phenomenon in which the rear edge of the image formed on the sheet moves backward, that is, the image is lengthened on the sheet. In a terrible case, the blank space provided at the sheet rear edge portion completely disappears. This phenomenon relates to a printing ratio on the sheet, and occurs in the case in which the printing ratio is high.

As a result of studies for finding out the cause of the above-described phenomenon, the present inventors found that the phenomenon is caused by a phenomenon in which the sheet slips with respect to the photoreceptor at the transfer nip portion. The present inventors further found that this slipping is caused by a combination of the following factors: (i) a decrease in particle diameter of the toner, (ii) the difference in peripheral velocity between the photoreceptor and the transfer roller and (iii) the bended portion formed in front of the transfer nip portion.

That is, in the case in which the amount of toner between the sheet and the photoreceptor is large, the absorptive power between the sheet and the photoreceptor decreases due to the decrease in particle diameter of the toner. Because of the decrease in the absorptive power, the nip pressure of the transfer nip portion cannot overcome the pushing power generated by the bended portion formed in front of the transfer nip portion. Therefore, the sheet moves in accordance with the peripheral velocity of the transfer roller. As a result, the sheet slips with respect to the photoreceptor.

The following will explain a mechanism of the decrease in the absorptive power between the sheet and the photoreceptor in reference to FIGS. 16(a) and 16(b). FIGS. 16(a) and 16(b) show the transfer nip portion where the toner image is transferred. A conventional large-particle toner T is used in FIG. 16(a), and a small-particle toner t of today is used in FIG. 16(b).

At the transfer nip portion 127, the photoreceptor 121 and the transfer roller 125 are compressed against each other via the toner (T, t) and a sheet P in this order when viewed from the photoreceptor 121, and a transfer voltage is applied by a transfer voltage applying section 129 provided close to the transfer roller 125. The sheet P is conveyed in a sheet conveyance direction (indicated by an arrow X) by the rotational forces of the photoreceptor 121 and the transfer roller 125. Note that in FIGS. 16(a) and 16(b), an arrow Y indicates a rotation direction of the photoreceptor 121 and an arrow Z indicates a rotation direction of the transfer roller 125.

By applying the transfer electric field from the transfer roller 125 through the sheet P to the toner on the photoreceptor 121, the toner is absorbed by the sheet P. However, even in the case in which the thickness of a toner layer in FIG. 16(a) is the same as that in FIG. 16(b), an air layer in the toner layer made by the small-particle toner t is larger than an air layer in the toner layer made by the large-particle toner T.

Therefore, in the photoreceptor, the toner, the sheet and the transfer roller, the distance of propagation of the electric field is longer in the toner layer of the small-particle toner t than in the toner layer of the large-particle toner T. In the case in which the distance of propagation is long, the intensity of the electric field (electric field intensity) becomes low when the electric field propagates the toner layer and reaches the photoreceptor 121. As a result, the absorptive power between the sheet P and the photoreceptor 121 decreases.

Since the absorptive power between the sheet P and the photoreceptor decreases, the phenomenon of slipping of the sheet with respect to the photoreceptor occurs by the pushing power of the bended portion formed in front of the transfer nip portion. As a result, the phenomenon of backward movement of the rear edge of the image transferred to the sheet P occurs.

In the case in which the rear edge of the image moves backward and the blank space provided at the rear edge portion of the sheet completely disappears, there are problems in that the remaining toner on the photoreceptor causes printing stain when printing an image on the following sheet(s) and the printing quality (image quality) deteriorates because of no blank space. In addition to these, in a compact image forming apparatus which employs a switchback conveyance method and is capable of carrying out two-side printing, the sheet winds around a fixing roller and the jam occurs.

In the switchback conveyance method, a front edge and a rear edge reverse between when printing on a first surface and when printing on a second surface. That is, the rear edge portion of the first surface becomes the front edge portion of the second surface. In the case in which the blank space at the front edge portion disappears, the sheet is conveyed to a fixing process that is the next process of the transfer process and the unfixed toner is molten and fixed, the molten toner sticks to the fixing roller, the sheet winds around the fixing roller and the jam occurs.

This problem occurs since the particle diameter of the toner has been reduced. Therefore, this problem is a new problem which had not been considered in the past. Since the techniques disclosed in the above-described Japanese Unexamined Patent Publication Nos. 101769/1991 and No. 068874/1997 do not consider the problem, those techniques, of course, cannot solve the problem.

SUMMARY OF THE INVENTION

An object of the present invention is to provide an image forming apparatus which can surely secure a blank space provided at a rear edge portion of a sheet even if the sheet slips with respect to a photoreceptor, that is, a slip phenomenon occurs.

In order to achieve the above object, an image forming apparatus of the present invention forms on an electrostatic latent image bearing member an electrostatic latent image based on image information, visualizes the electrostatic latent image by a developer so as to obtain a visible image, and causes a transfer device to transfer the visible image to a recording material at a transfer nip portion while conveying the recording material, and the image forming apparatus includes: image elongation predicting means (image elongation predicting section) for predicting the occurrence of an image elongation, in other words, predicting that, due to slipping of the recording material with respect to the electrostatic latent image bearing member at the transfer nip portion, the visible image transferred is lengthened in a direction in which the recording material is conveyed; and image rear edge adjusting means (image rear edge adjusting section) for deleting a rear edge portion of the electrostatic latent image if said image elongation predicting means predicts the occurrence of the image elongation.

According to the above, the image elongation predicting means predicts the occurrence of the image elongation, that is, predicts that, due to the slipping of the recording material with respect to the electrostatic latent image bearing member at the transfer nip portion, the visible image transferred to the recording material is lengthened in the direction in which the recording material is conveyed. When the image elongation predicting means predicts the occurrence of the image elongation, the image rear edge adjusting means deletes the rear edge portion of the electrostatic latent image.

Therefore, even if the image is lengthened on the recording material when the image is transferred, the image rear edge adjusting means forcibly deletes the rear edge portion of the electrostatic latent image formed on the electrostatic latent image bearing member, on the basis of the prediction by the image elongation predicting means, and the toner image itself is shortened in the direction in which the recording material is conveyed. On this account, the blank space at the rear edge portion of the recording material is secured.

As a result, it is possible to avoid the problems caused due to the reduction or disappearance of the blank space at the rear edge portion of the recording material. The problems are exemplified by (i) the printing stain caused by the remaining developer on the electrostatic latent image bearing member when printing an image on the following sheet(s), (ii) the deterioration in the printing quality (image quality) because of no blank space and (iii) the jam at the fixing section when carrying out the two-side printing adopting the switchback conveyance method.

The image forming apparatus of the present invention can be configured so as to further include: deletion amount setting means (deletion amount setting section) for setting the amount of the rear edge portion to be deleted from the electrostatic latent image, the amount being set in accordance with the amount of the visible image lengthened due to the image elongation; and the image rear edge adjusting means deleting the rear edge portion of the electrostatic latent image on the basis of the amount of the rear edge portion to be deleted, the amount being set by the deletion amount setting means.

According to the above, the deletion amount setting means sets the amount of the rear edge portion to be deleted from the electrostatic latent image, the amount being set in accordance with the amount of the visible image lengthened due to the image elongation, and the image rear edge adjusting means deletes the rear edge portion of the electrostatic latent image on the basis of the amount set by the deletion amount setting means.

Therefore, the amount of the rear edge portion to be deleted from the electrostatic latent image by the rear edge adjusting means is the amount set by the deletion amount setting means, that is, the amount determined in accordance with the amount of the visible image lengthened due to the image elongation. On this account, the blank space at the rear edge of the recording material can have a predetermined size as if no image elongation had occurred.

As a result, it is possible to appropriately avoid the problems caused due to the reduction or disappearance of the blank space at the rear edge portion of the recording material. In addition, it is possible to further improve the print quality.

Additional objects, features, and strengths of the present invention will be made clear by the description below.

Further, the advantages of the present invention will be evident from the following explanation in reference to the drawings.

BRIEF DESCRIPTION OF THE DRAWINGS

FIG. 7 is an explanatory diagram showing contents in a sheet rear edge void setting change table used when the image forming apparatus carries out a two-side printing.

FIG. 8 is an explanatory diagram showing contents in a sheet rear edge void setting change table used when the image forming apparatus carries out a one-side printing.

FIG. 11 is an explanatory diagram showing contents of another sheet rear edge void setting change table used by an image forming apparatus of another embodiment of the present invention.

FIG. 12 is an explanatory diagram showing contents of still another sheet rear edge void setting change table used by the image forming apparatus of the above-described another embodiment of the present invention.

FIG. 13 is an explanatory diagram showing contents of yet another sheet rear edge void setting change table used by the image forming apparatus of the above-described another embodiment of the present invention.

FIG. 14 is an explanatory diagram showing contents of yet another sheet rear edge void setting change table used by the image forming apparatus of the above-described another embodiment of the present invention.

DESCRIPTION OF THE EMBODIMENTS

The following will explain one embodiment of the present invention in reference to FIGS. 1 to 15. Note that the present invention is not limited to this.

Figure 2:
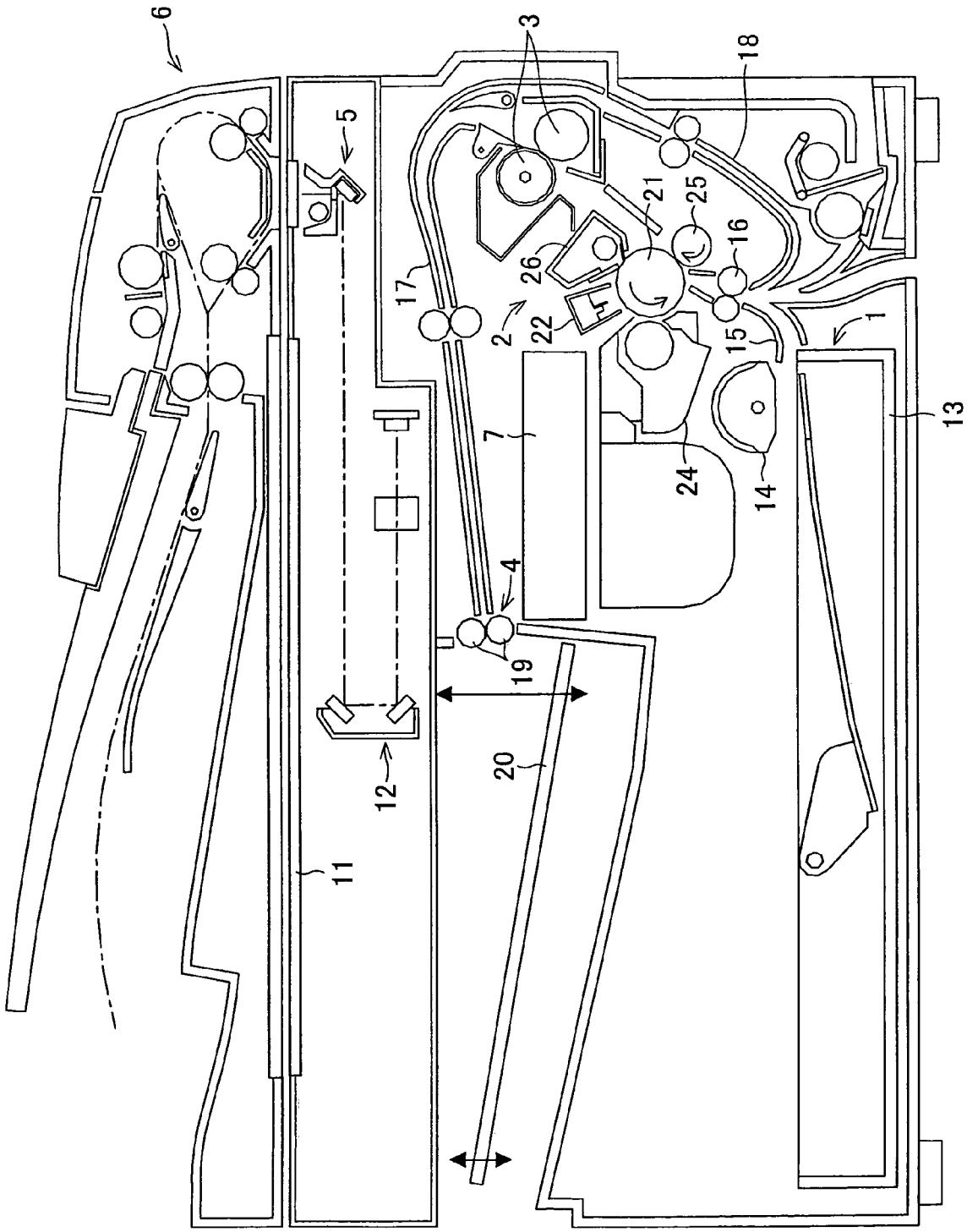
FIG. 2 is a vertical cross-sectional view showing an arrangement of the image forming apparatus.
Figure 3:
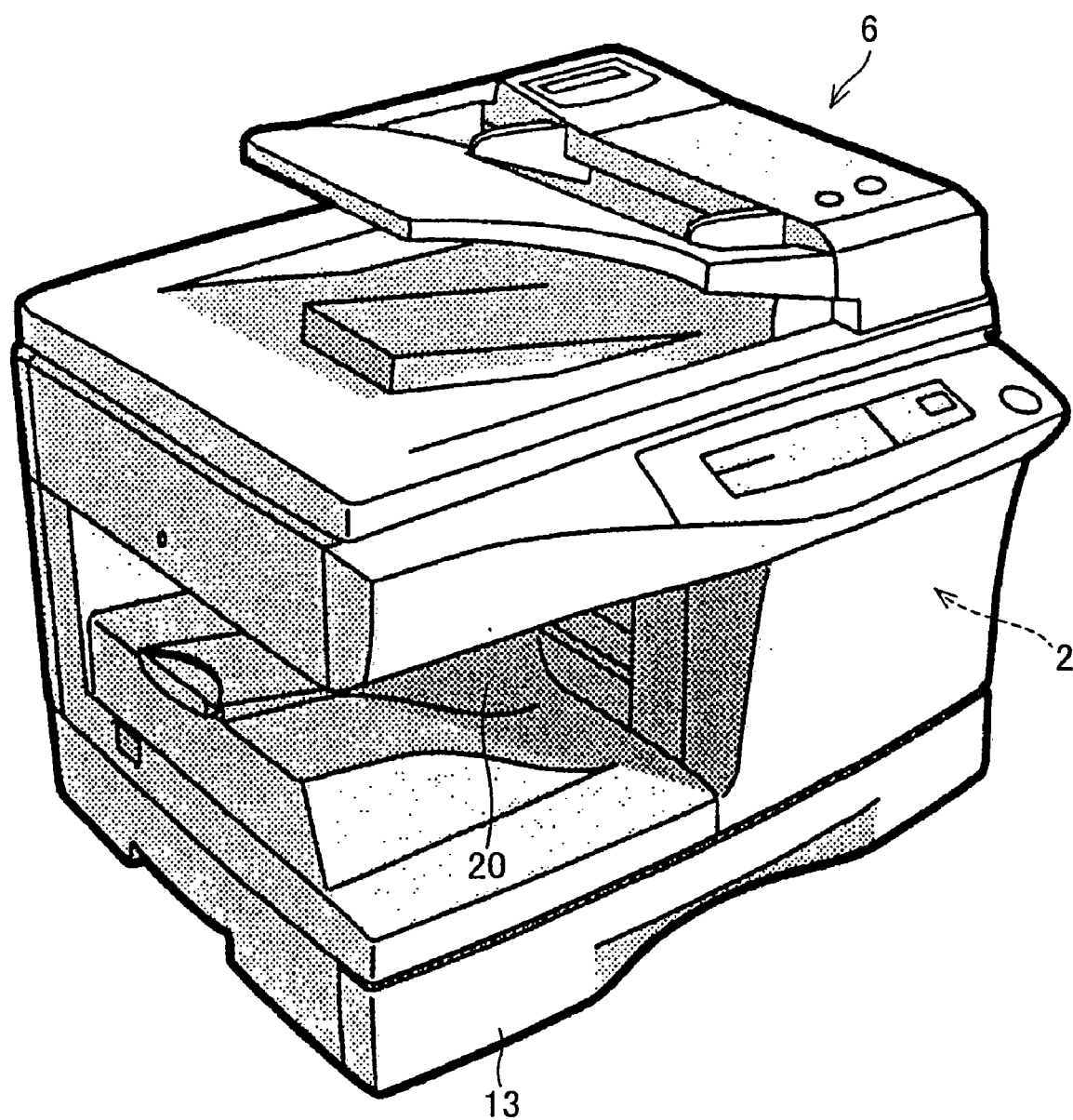
FIG. 3 is a perspective view showing an exterior of the image forming apparatus.
Figure 4:
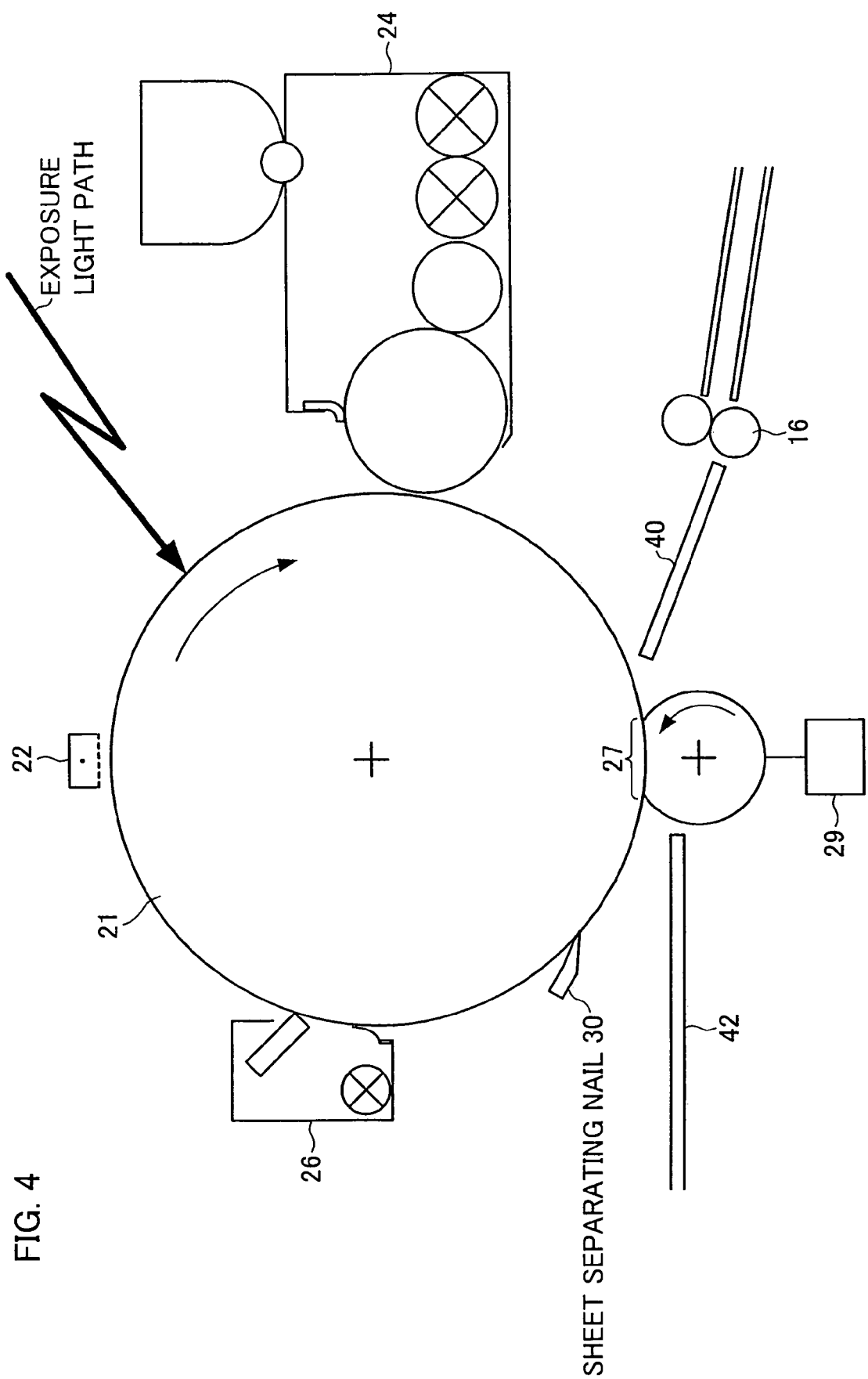
FIG. 4 is an explanatory diagram showing an arrangement of an image forming section of the image forming apparatus.
Figure 5:
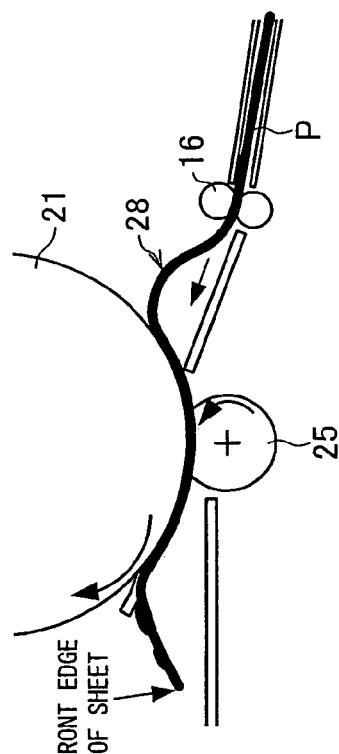
FIGS. 5(a) to 5(e) are explanatory diagrams showing how a sheet is conveyed to a transfer nip portion of the image forming apparatus.
Figure 5:
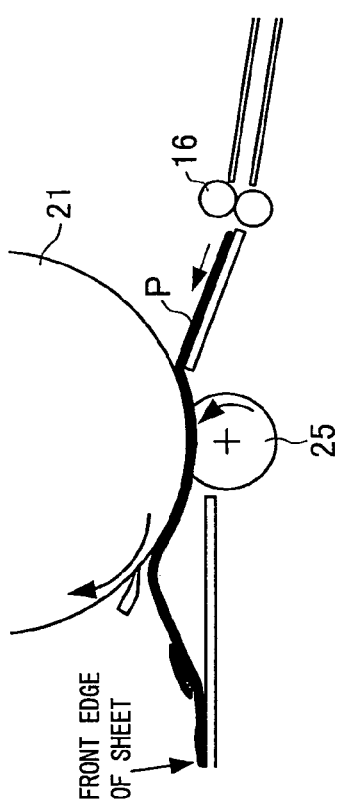
Figure 5:
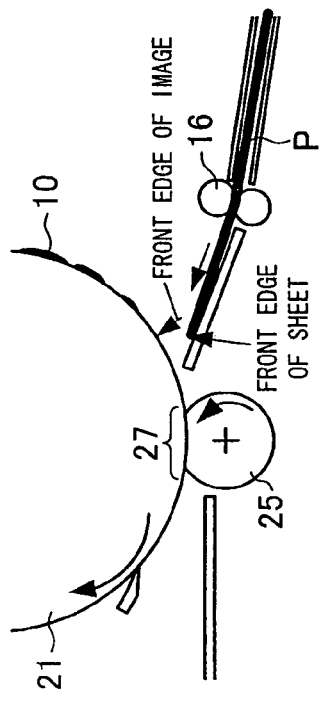
Figure 5:
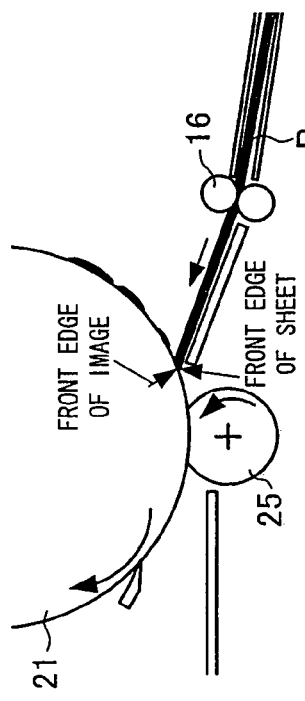
Figure 5:
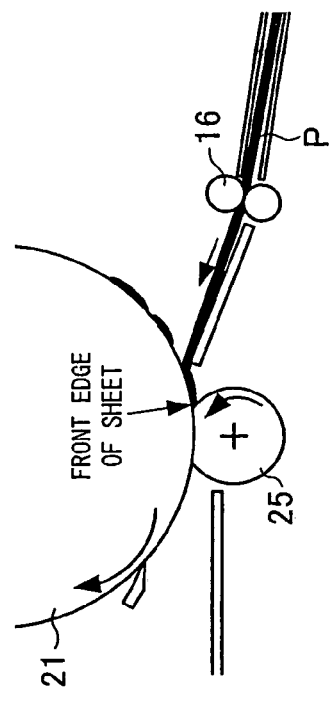

As shown in FIG. 2 that is a vertical cross-sectional view, an image forming apparatus of the present embodiment includes, along a direction in which a sheet (recording material) is conveyed, a sheet feeding section 1, an image forming section 2, a fixing section 3 and a sheet ejecting section 4, and an image scanning section 5 is provided above these sections. Further, an automatic document conveying device 6 that is an option is provided above the image scanning section 5. FIG. 3 shows an exterior of the present image forming apparatus, and FIG. 4 shows an arrangement of the image forming section 2.

Note that the following description in the present embodiment explains the image forming apparatus which can carry out both a black-and-white one-side printing and a black-and-white two-side printing. However, the present embodiment is not limited to this, and is applicable to a color image forming apparatus.

A document table 11 for mounting a document is provided near the image scanning section 5, and the automatic document conveying device 6 is provided above the document table 11 such that the automatic document conveying device 6 can be opened and closed. The automatic document conveying device 6 also functions as a document cover for preventing the mounted document from floating and for mounting the document in an appropriate place.

Image information of the document mounted on the document table 11 is read by an optical unit 12 provided under the document table 11. The image information read is subjected to an image processing by a control section 7, and is once stored in a memory (not shown) as the image information. Similarly, image information of a document conveyed by the automatic document conveying device 6 is read by the optical unit 12.

In the sheet feeding section 1, a sheet feeding cassette 13 is provided for housing sheets. The sheet in the sheet feeding cassette 13 is conveyed to a conveyance path 15 by the rotation of a sheet feeding roller 14. On the conveyance path 15 and in front of the image forming section 2, an idle roller 16 is provided. The conveyance of the sheet once stops when the front edge of the sheet reaches the idle roller 16. The idle roller 16 stops in order to match the front edge of an image transfer region on the sheet with the front edge of a toner image visualized on a photoreceptor 21 described later.

The image forming section 2 forms an image based on the image information, and transfers the image to the sheet. As shown in FIG. 4, the image forming section 2 includes the photoreceptor 21 that is in the shape of a cylinder. Further, the image forming section 2 includes, around the photoreceptor 21, a main charging device 22, a laser scanner unit (not shown), a developing device 24, a transfer device including a transfer roller 25, a sheet separating nail 30, a cleaning section 26, etc.

The main charging device 22 applies a certain voltage to the photoreceptor 21 to charge the surface of the photoreceptor 21 at a predetermined potential. The laser scanner unit reads out the image information from the memory of the control section 7, and exposes the photoreceptor 21 with laser light modulated by the image information, so as to form on the photoreceptor 21 an electrostatic latent image based on the image information.

The laser scanner unit forms the electrostatic latent image based on (i) the image information of the document mounted on the document table 11 and read by the image scanning section 5, (ii) the image information of the document which is moving by the auto document conveying device 6 and (iii) image information transmitted from each terminal device on a network (not shown) connected to the present image forming apparatus.

The toner (developer); in the developing device 24 is supplied from a developing roller to the surface of the photoreceptor 21. In this way, the electrostatic latent image formed on the photoreceptor 21 is visualized, that is, the electrostatic latent image becomes a toner image. This visualization is realized in such a manner that the toner is deposited on the surface of the photoreceptor 21 in accordance with a potential contrast of the electrostatic latent image on the photoreceptor 21. A developing bias is applied to the developing roller so that the toner is easily deposited on the photoreceptor 21.

The toner image on the photoreceptor 21 is conveyed toward the transfer roller 25 by the rotation of the photoreceptor 21. Moreover, the idle roller 16 restarts rotating. In this way, the toner image is transferred at an appropriate position on the sheet when the sheet passes through the transfer nip portion 27 where the photoreceptor 21 and the transfer roller 25 are compressed against each other. The transfer voltage is applied from the transfer voltage applying section 29 through the transfer roller 25 to the transfer nip portion 27, and the sheet absorbs the toner by the transfer voltage. Then, the sheet is separated from the photoreceptor 21 by the sheet separating nail 30, and is conveyed to the fixing process by the rotational forces of the photoreceptor 21 and the transfer roller 25. Note that details of the transfer process will be described later.

The toner image transferred to the sheet is conveyed to the fixing section 3 in the next process. The toner image is molten and fixed on the sheet by the heat and pressure of the fixing section 3. Note that the fixing section 3 includes a heating roller and a pressure roller.

The sheet on which the toner image is fixed is conveyed in a conveyance path 17. In the case of the one-side printing, the sheet is ejected through a sheet ejecting roller 19 onto a sheet ejecting tray 20. In the case of the two-side printing, the rear edge portion of the sheet is held by the sheet ejecting roller 19 to once stop the sheet when the sheet passes through the sheet ejecting roller 19. Then, the sheet is conveyed from the conveyance path 17 to a sub conveyance path 18 by reversely rotating the sheet ejecting roller 19.

Such technique of reversely conveying the sheet is generally called a "switchback conveyance", and the sub conveyance path 18 is also referred to as a switchback conveyance path. After the sheet is reversely conveyed and its front surface and back surface are reversed, the sheet again reaches the idle roller 16. The toner image newly visualized by the image forming section 2 on the basis of the image information to be printed on the back surface (second surface) is transferred to and fixed on the back surface of the sheet. Then, the sheet is ejected through the conveyance path 17 and the sheet ejecting roller 19 onto the sheet ejecting tray 20.

Note that the foregoing description explains a general printing procedure of an electrophotographic printing method, and it is clear that a post-processing unit, a paper feeding unit having a plurality of stages for housing various types of sheets, and a paper ejecting tray having a plurality of bins for easily sorting ejected sheets are applicable to the present image forming apparatus in order to realize multi-function.

The following will explain the transfer process in the present image forming apparatus.

Again, in the case of the present image forming apparatus, the peripheral velocity of the transfer roller 25 is higher than that of the photoreceptor 21 due to the above-described reason. Therefore, the sheet is pulled due to the difference in the peripheral velocity between the photoreceptor 21 and the transfer roller 25, so that the sheet is separated from the photoreceptor 21. Note that the peripheral velocity of the idle roller 16 is the same as that of the transfer roller 25.

In the case in which the peripheral velocity of the photoreceptor 21 is V1 (mm/sec), the peripheral velocity of the transfer roller 25 is V2 (mm/sec) and the peripheral velocity of the idle roller 16 is V3 (mm/sec) in the present image forming apparatus, these V1, V2 and V3 are designed so as to satisfy V1<V2≈V3 (that is, V1<V2=V3 (V3 ranges from 0.99×V2 to 1.012×V2)). Here, in order that a bended portion having a predetermined amount is formed in front of the transfer nip portion 27, these V1, V2 and V3 are designed so as to satisfy V1×1.005≦V2≈V3≦V1×1.03.

Moreover, the sheet conveyed from the idle roller 16 is conveyed to a contact point of the transfer nip portion 27 in such a direction that the front edge of the sheet proceeds toward an outer circumference of the photoreceptor 21. After the front edge of the sheet first contacts with the photoreceptor 21, the sheet is conveyed to the transfer nip portion 27 by the rotation of the photoreceptor 21.

FIGS. 5(a) to 5(e) show how a sheet P is conveyed to the transfer nip portion 27. The toner image 10 formed on the photoreceptor 21 is conveyed to the transfer nip portion 27 by the rotation of the photoreceptor 21, and the sheet P is conveyed to the transfer nip portion 27 by the rotation of the idle roller 16. The sheet P conveyed from the idle roller 16 is conveyed to the contact point of the transfer nip portion 27 by the guidance of a paper guide 40 in such a direction that the front edge of the sheet P proceeds toward the outer circumference of the photoreceptor 21. Therefore, the sheet P first contacts with the photoreceptor 21. Then, the sheet P is guided to the transfer nip portion 27 by the rotation of the photoreceptor 21. The sheet P and the photoreceptor 21 contact with each other so that the front edge of the toner image 10 and the front edge of a region where on the sheet P the image is formed (that is, the front edge of a region obtained by omitting from the entire region of the sheet a blank space (front edge void) provided at the front edge portion) match with each other by controlling the timing of the restart of the rotation of the idle roller 16.

The sheet P passes through the transfer nip portion 27, and the toner image 10 is transferred onto the sheet 10. The front edge portion of the sheet P is separated from the photoreceptor 21 by the sheet separating nail 30, and the sheet P is conveyed along a paper guide 41. Moreover, as described above, a portion which has not yet passed through the transfer nip portion 27 sequentially passes through the transfer nip portion 27 while forming the bended portion 28 in front of the transfer nip portion 27. After the rear edge of the sheet P finishes passing through the idle roller 16, the bended portion 28 disappears, and the rear edge portion of the sheet P is conveyed along the paper guide 40.

In the image forming apparatus arranged as above, in the case in which a large amount of toner is between the photoreceptor 21 and the sheet P due to the reduction in the particle diameter of the toner, the sheet P slips with respect to the photoreceptor 21 and the rear edge of the image transferred onto the sheet moves backward. Thus, the blank space provided at the rear edge portion of the sheet P reduces or disappears. Therefore, the toner remaining on the photoreceptor 21 causes stain, and the printing quality (image quality) deteriorates because of no blank space. In addition to these, in the case of the present image forming apparatus adopting the switchback conveyance method, there are problems in that for example, when printing onto the second surface for the two-side printing, the jam occurs at the fixing section 3.

In order to prevent the reduction or disappearance of the blank space at the rear edge portion of the sheet P, the following countermeasures are taken in the present image forming apparatus. Note that in the following description, the blank space provided forcibly at the peripheral edge potion of the sheet is referred to as a void. In addition, the blank spaces provided at the rear edge portion, the front edge portion, the left edge portion and the right edge portion of the sheet P are referred to as a rear edge void, a front edge void, a left edge void and a right edge void, respectively.

The present image forming apparatus includes (i) an image elongation predicting section (image elongation predicting means) for predicting the occurrence of an image elongation, in other words, predicting that, due to slipping of the sheet P with respect to ht e photoreceptor 21 at the transfer nip portion 27, the image that is the transferred toner image is lengthened on the sheet P and (ii) an image rear edge adjusting section (image rear edge adjusting means) for, if the image elongation predicting section predicts the occurrence of the image elongation, deleting the rear edge portion of the electrostatic latent image formed on the photoreceptor 21.

With this, even in the case in which the sheet P slips with respect to the photoreceptor 21 at the transfer nip portion 27, the image is lengthened on the sheet P and the rear edge of the image moves backward, the image elongation predicting section predicts the occurrence of the image elongation and the image rear edge adjusting section forcibly deletes on the basis of the above prediction the rear edge portion of the electrostatic latent image formed on the photoreceptor 21 and shortens the toner image itself in the direction in which the sheet P is conveyed. Therefore, even if the image is lengthened on the sheet P, the rear edge void is secured. In this way, it is possible to avoid the above-described problems caused by the reduction or disappearance of the rear edge void.

In addition, the present image forming apparatus further includes a deletion amount setting section (deletion amount setting means) for setting the amount of the rear edge portion to be deleted from the electrostatic latent image in accordance with the amount of the toner image lengthened due to the occurrence of the image elongation. The image rear edge adjusting section deletes the rear edge portion of the electrostatic latent image in accordance with the amount of the rear edge portion to be deleted which amount is set by the deletion amount setting section.

Therefore, since the amount of the rear edge portion to be deleted from the electrostatic latent image by the image rear edge adjusting section is set in accordance with the amount of the toner image lengthened due to the occurrence of the image elongation, the rear edge void can have a predetermined size as if no image elongation had occurred. Therefore, it is possible to avoid the above-described problems appropriately. In addition, it is possible to improve the printing quality.

Figure 1:
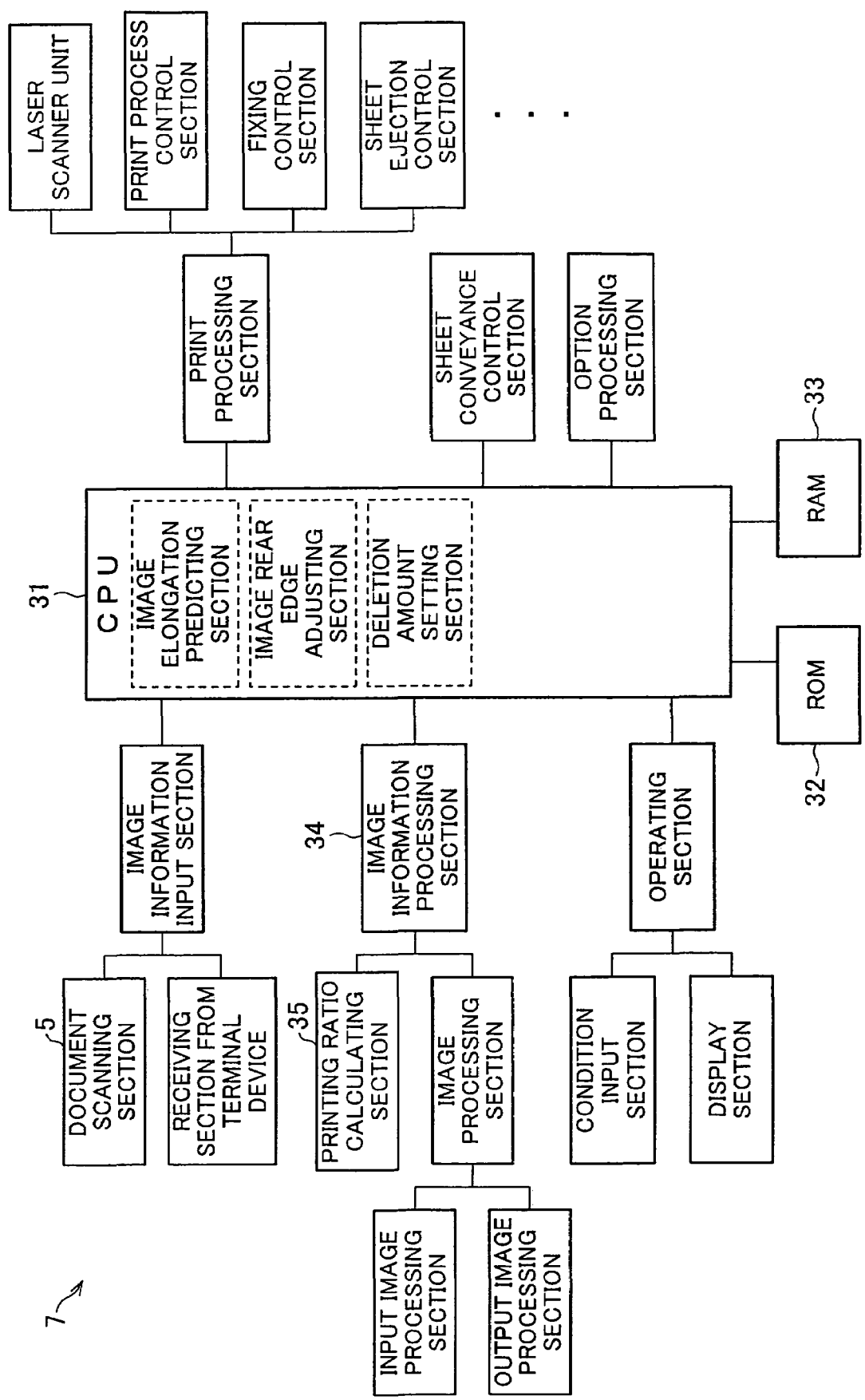
FIG. 1 shows one embodiment of the present invention and is a block diagram showing an arrangement of a control section of an image forming apparatus.

The image elongation predicting section, the image rear edge adjusting section and the deletion amount setting section are realized by a CPU 31, a ROM 32 and a RAM 33 included in the control section 7 shown in FIG. 1, and a printing ratio calculating section 35 in an image information processing section 34.

The following will explain the control section 7 of the present image forming apparatus in reference to FIG. 1. FIG. 1 is a block diagram showing an arrangement of the control section 7 of the present image forming apparatus.

The CPU 31 is a brain for controlling all the operations of the image forming apparatus. That is, the CPU 31 receives from an image information input section the image information transmitted from the terminal device and/or the image information read by the image scanning section 5. Then, the CPU 31 causes the image information processing section 34 to process the image information in accordance with instructions, such as a print condition, a print request, etc., supplied from an operating section, such as a condition input section, a display section, etc.

Then, the CPU 31 supplies the processed image information to a print processing section. Then, the CPU 31 controls the laser scanner unit, a print process control section for controlling the image forming section 2, a fixing control section for controlling the fixing section 3, a sheet ejection control section for controlling the sheet ejecting section 4, etc., and also causes a sheet conveyance control section to control a sheet conveying system, such as the sheet feeding section 1, the idle roller 16, etc. In this way, the image is formed on the sheet P having a predetermined size instructed. Moreover, the CPU 31 also causes an option processing section to control an option device, such as the automatic document conveying device 6, etc.

The image information processing section 34 includes as an image processing section (i) an input image processing section for carrying out a predetermined image processing with respect to the image information supplied through the image information input section and (ii) an output image processing section for carrying out a predetermined image processing with respect to image data processed by the input image processing section so as to obtain output image data to be outputted to the print processing section. The image information processing section 34 further includes a printing ratio calculating section 35 for calculating a printing ratio described later.

The CPU 31 uses a result of a calculation done by the printing ratio calculating section 35, as one of factors for predicting the occurrence of the image elongation and as one of factors for setting the amount of the rear edge portion to be deleted from the electrostatic latent image.

The ROM 32 includes the functions of the image elongation predicting section, the image rear edge adjusting section and the deletion amount setting section, and stores various programs used by the CPU 31 for causing the present image forming apparatus to function and data, such as the number of steps of a motor, etc. The RAM 33 is a storage section (memory) used by the CPU 31.

The following will explain how the image elongation predicting section predicts the occurrence of the image elongation. As a result of diligent studies, the present inventors found that the slip phenomenon of the sheet P which phenomenon causes the image elongation closely relates to the printing ratio of a region on the sheet P which region passes through the transfer nip portion 27 while the bended portion 28 exists. The present inventors further found that it is possible to effectively predict the occurrence of the image elongation on the basis of the printing ratio of the above-described region of the sheet P.

Figure 6:
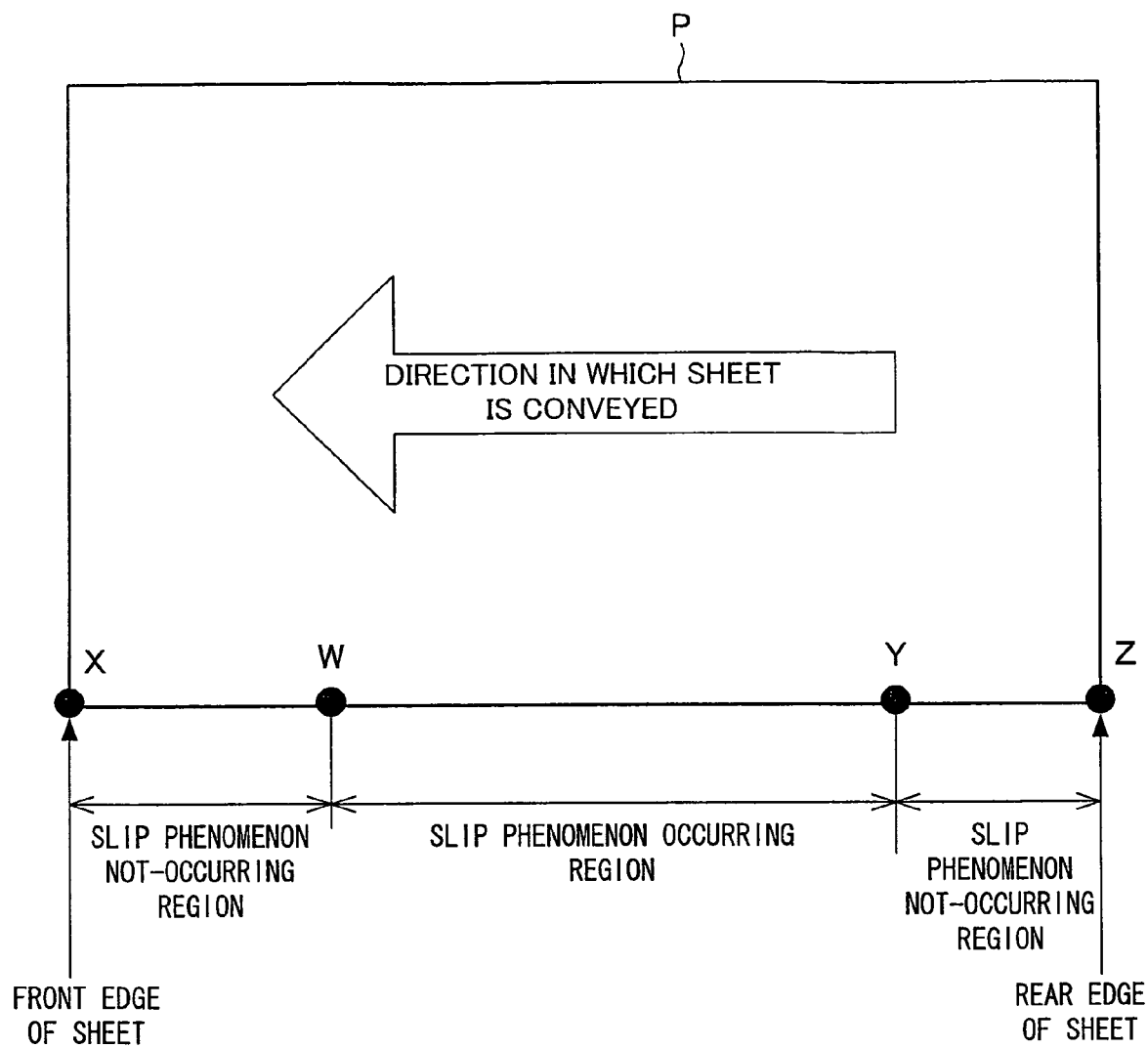
FIG. 6 is an explanatory diagram showing a slip phenomenon occurring region on a sheet used by the image forming apparatus, and the slip phenomenon occurring region is determined depending on the length of the sheet in a direction in which the sheet is conveyed.

The bended portion 28 disappears after the rear edge of the sheet P finishes passing through the idle roller 16. Therefore, as shown in FIG. 6, a certain region (Y-Z) which passes through the transfer nip portion 27 after the rear edge of the sheet P finishes passing through the idle roller 16 is a slip phenomenon not-occurring region where no slip phenomenon occurs no matter how high the printing ratio is. The length of this region in the direction in which the sheet is conveyed is substantially equal to the separation distance between the transfer nip portion 27 and the idle roller 16.

Moreover, it is empirically confirmed that a certain region (X-W) is also a region where no slip phenomenon occurs no matter how high the printing ratio is. This is because the bended portion 28 is not formed sufficiently. Therefore, the certain region (X-W) which passes through the transfer nip portion 27 before the bended portion 28 is sufficiently formed is also the slip phenomenon not-occurring region. Note that the slip phenomenon not-occurring region (X-W) at the front edge of the sheet varies depending on the differences in peripheral velocity between the photoreceptor 21 and the transfer roller 25 and between the photoreceptor 21 and the idle roller 16, the amount of the bended portion 28, etc.

In the present image forming apparatus, between the slip phenomenon not-occurring region (X-W) at the front edge of the sheet and the slip phenomenon not-occurring region (Y-Z) at the rear edge of the sheet is a slip phenomenon occurring region. The printing ratio calculating section 35 calculates the printing ratio of the slip phenomenon occurring region (W-Y) on the basis of the image information.

The printing ratio calculated by the printing ratio calculating section 35 is a printing ratio on the sheet P onto which the toner image is transferred. The printing ratio of the slip phenomenon occurring region (W-Y) is a printing ratio obtained by averaging printing ratios calculated per a plurality of scanning lines or per one scanning line on the basis of the output image data processed by the output image processing section.

Here, the printing ratio is calculated per a nip size (a size in the direction in which the sheet is conveyed) of the transfer nip portion 27, and the printing ratios calculated are averaged. For example, in the case in which the resolution is 600 Ddpi and the transfer nip is 2.5 mm, the printing ratio can be calculated per 60 sub-scanning lines.

The printing ratio of 60 sub-scanning lines can be obtained on the basis of the output image data by the following equation (1).

$$(\Sigma(\text{the total number of pixels in the image in 60 sub-scanning lines})/\Sigma(\text{the total number of pixels in 60 sub-scanning lines}))\times 100\% \qquad (1)$$

The total number of pixels in the image in 60 sub-scanning lines is the total number of valid pixels to which the toner is deposited (which form dots) in 60 sub-scanning lines. The total number of pixels in 60 sub-scanning lines is a value determined depending on the size of the sheet P in a main scanning direction (that is, in a direction orthogonal to the direction in which the sheet is conveyed). In the case in which the left edge void and/or the right edge void are provided, the pixels in these voids are included in the total number of pixels in 60 sub-scanning lines as invalid pixels to which the toner is not deposited (which do not form dots).

In the case of the color image forming apparatus which forms an image by, for example, four colors that are cyan, magenta, yellow and black, the printing ratio is calculated for each color, the printing ratios calculated are added, and the printing ratios added are averaged. That is, in the case in which the printing ratios obtained for cyan, magenta, yellow and black by using the above equation (1) are Z1, Z2, Z3 and Z4, respectively, the printing ratio calculating section 35 carries out the addition of Z1, Z2, Z3 and Z4, and divides the sum of Z1, Z2, Z3 and Z4 by four that is the number of colors. The obtained value is used as the printing ratio of the slip phenomenon occurring region (W-Y).

The CPU 31 includes, for example, a sheet rear edge void setting change table shown in FIG. 7. Whether the image elongation occurs or not and the amount of the rear edge portion to be deleted from the electrostatic latent image are found out in accordance with the sheet size instructed by the print request and the printing ratio calculated by the printing ratio calculating section 35.

The sheet rear edge void setting change table is created on the basis of data obtained by repeatedly carrying out a test in which the amount of the rear edge void reduced is measured while variously changing a combination of the printing ratio and the sheet size. As is clear from FIG. 7, as the sheet size becomes bigger, the amount of the rear edge portion to be deleted from the electrostatic latent image is determined even in the case in which the printing ratio is low. That is, the bigger the sheet size becomes, the larger in area the slip phenomenon occurring region becomes. Since the slip phenomenon occurring region is large in area, the rear edge of the image moves backward even if the printing ratio is low and the frequency of occurrence of the slip phenomenon is low (the amount of the image elongation per unit area is small).

For example, in the case in which the CPU 31 includes the sheet rear edge void setting change table shown in FIG. 7, the sheet size instructed by the print request is A4 size vertical feed and the printing ratio calculated by the printing ratio calculating section 35 is 85%, the CPU 31 predicts that the image elongation occurs and sets that the amount of the rear edge portion to be deleted from the electrostatic latent image is 1 mm.

Moreover, in the case of the present image forming apparatus, according to the separation distance between the idle roller 16 and the transfer nip portion 27, the differences in velocity between the photoreceptor 21 and the transfer roller 25 and between the photoreceptor 21 and the idle roller 16, and the amount of the bended portion 28, the slip phenomenon occurring region do not exist in a sheet having (i) a postcard size or smaller, (ii) a B5 size or smaller and (iii) an A4 size horizontal feed. Therefore, the CPU 31 uses the length of the sheet P in the direction in which the sheep P is conveyed, as one of factors for predicting the occurrence of the image elongation or as one of factors for setting the amount of the rear edge portion to be deleted. The CPU 31 judges that the image elongation does not occur in the case in which the sheet size is A4 horizontal feed or smaller.

FIG. 8 shows another sheet rear edge void setting change table. The sheet rear edge void setting change table shown in FIG. 7 is used when the CPU 31 carries out the two-side printing, and the sheet rear edge void setting change table shown in FIG. 8 is used when the CPU 31 carries out the one-side printing. As is clear from the comparison between FIG. 7 and FIG. 8, even if the sheet size and the printing ratio are the same between when carrying out the one-side printing and when carrying out the two-side printing, the amount of the rear edge portion to be deleted from the electrostatic latent image is different between them. Specifically, the mount of the rear edge portion to be deleted when the CPU 31 carries out the two-side printing is larger than that when the CPU 31 carries out the one-side printing.

The reduction or disappearance of the rear edge void when carrying out the two-side printing causes the reduction or disappearance of the front edge void of the second surface of the sheet conveyed by the switchback conveyance. This further causes the jam of the sheet P at the fixing section 3. However, as described above, by setting the amount of the rear edge portion to be deleted when carrying out the two-side printing larger than the amount of the rear edge portion to be deleted when carrying out the one-side printing, it is possible to surely avoid the jam at the fixing section 3.

Unlike when carrying out the two-side printing, it is not necessary to consider the jam at the fixing section 3 when carrying out the one-side printing. Therefore, by setting the amount of the rear edge void to be the minimum amount, that is, such amount that the toner does not remain on the photoreceptor 21, it is possible to minimize the amount of the rear edge portion that is forcibly deleted from the electrostatic latent image, and also possible to secure the amount of information expressed on the sheet P.

Note that the condition(s) for predicting the image elongation may be differed between when carrying out the one-side printing and when carrying out the two-side printing, that is, may be the condition(s) (printing ratio, etc.) by which the image elongation does not occur when carrying out the one-side printing but occurs when carrying out the two-side printing.

In the present image forming apparatus, the sheet rear edge void setting change table shown in FIG. 7 is used for both the first surface and the second surface when the CPU 31 carries out the two-side printing. Therefore, the positions of the images on the first surface and on the second surface are identical with each other. On this account, it is possible to further improve the printing quality.

According to diligent studies by the present inventors, the frequency of occurrence of the slip phenomenon causing the image elongation changes depending on (i) the thickness of the sheet P, (ii) the smoothness of the sheet P and (iii) the humidity and temperature in the image forming apparatus (apparatus internal environment information), which (i), (ii) and (iii) are not adopted in the present image forming apparatus, though.

For example, as the thickness of the sheet P increases, the stiffness of the sheet P also increases. Therefore, the sheet P slips more, and the amount of the image lengthened also increases. Meanwhile, as the smoothness of the sheet P deteriorates, the surface of the sheet P becomes rough and uneven. Therefore, the toner moves as if the toner rolls on the uneven surface. That is, the sheet P easily slips, and the amount of the image lengthened becomes large.

Moreover, like the thickness of the sheet P, the temperature and humidity in the image forming apparatus change the stiffness of the sheet P. For example, the stiffness of the sheet P decreases (disappears) under conditions of high temperature and high humidity. Therefore, the sheet P hardly slips and the amount of the image lengthened becomes small. In contrast, the stiffness of the sheet P increases under conditions of low temperature and low humidity. Therefore, the sheet P easily slips and the amount of the image lengthened becomes large.

FIGS. 11 to 14 shows the sheet rear edge void setting change tables created based on different temperatures and humidity. The sheet rear edge void setting change table shown in FIG. 11 is used under conditions of low temperature and low humidity. The sheet rear edge void setting change table shown in FIG. 12 is used under conditions of low temperature and normal humidity and conditions of normal temperature and low humidity. The sheet rear edge void setting change table shown in FIG. 13 is used under conditions of normal temperature and high humidity and conditions of high temperature and normal humidity. The sheet rear edge void setting change table shown in FIG. 14 is used under conditions of high temperature and high humidity. Note that the sheet rear edge void setting change table shown in FIG. 7 is used under conditions of low temperature and high humidity, conditions of normal temperature and normal humidity and conditions of high temperature and low humidity.

Note that the low temperature is equal to or higher than 5° C. and lower than 15° C., the normal temperature is equal to or higher than 15° C. and lower than 25° C. and the high temperature is equal to or higher than 25° C. and lower than 35° C. Moreover, the low humidity is equal to or higher than 10% and lower than 40%, the normal humidity is equal to or higher than 40% and lower than 70% and the high humidity is equal to or higher than 70% and lower than 90%.

Figure 9:
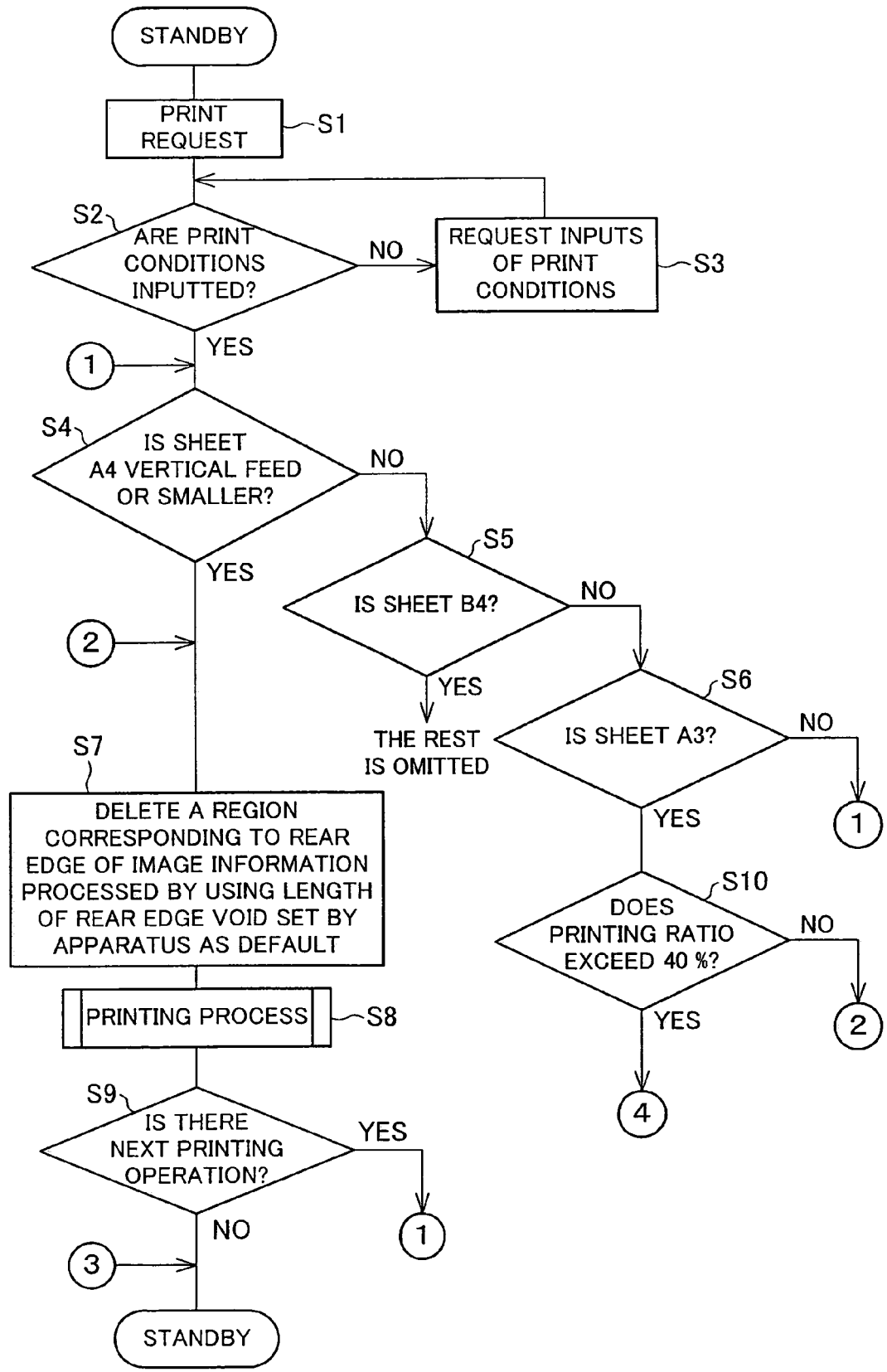
FIG. 9 is a flow chart showing steps for carrying out a printing by the image forming apparatus.
Figure 10:
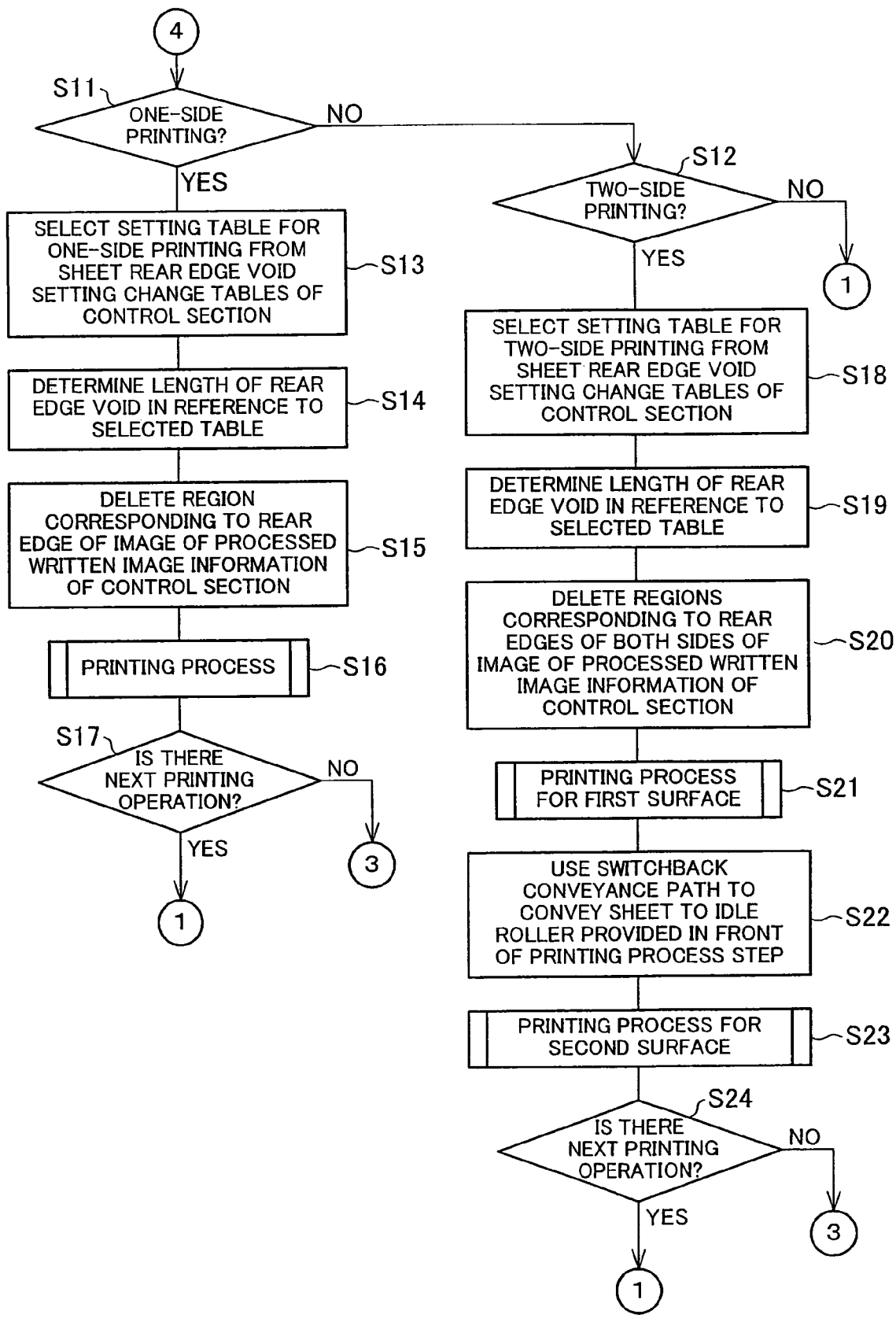
FIG. 10 is a flow chart that is a continuation of the flow chart of FIG. 9.

The following will explain image-forming operations carried out by the present image forming apparatus arranged as above in reference to flow charts of FIGS. 9 and 10.

After the print request is supplied to the present image forming apparatus that is in a standby state (S1) and print conditions are inputted, the CPU 31 checks necessary print conditions (S2). If the necessary print conditions are not inputted, the CPU 31 requests the input of the necessary print conditions (S3).

The print conditions to be checked here are, for example, (i) the sheet size of the sheet used for printing, (ii) whether the printing is the one-side printing or the two-side printing, (iii) an image density and (iv) print magnification, which (iii) and (iv) are necessary for calculating the printing ratio in a state in which the image based on the image information requested to be printed is formed on the sheet P.

After the CPU 31 checks the inputs of the necessary print conditions, the CPU 31 determines the sheet size (the size in the direction in which the sheet is conveyed) of the sheet P used for printing (S4 to S6).

As described above, in the present image forming apparatus, the slip phenomenon occurring region do not exist in a sheet having (i) a postcard size or smaller, (ii) a B5 size or smaller and (iii) an A4 size horizontal feed. Therefore, in the case in which the sheet size is the A4 size horizontal feed or smaller, the CPU 31 judges that the image elongation does not occur. Then, the CPU 31 deletes in accordance with the default amount of the rear edge void, a region corresponding to the rear edge of the image from the image information (output image data) processed by the image processing section (S7). Then, the electrostatic latent image is formed on the basis of the image information processed as above, and the image is formed on the sheet P (S8). Note that in order to appropriately position the image(s), it is preferable that the lengths of the default front edge void and default rear edge void be the same with each other. Then, the CPU 31 checks whether there is a next printing operation or not (S9). If there is the next printing operation, the process returns to S4. If there is no next printing operation, the image forming apparatus enters the standby state.

If the sheet size is A3 (S6), the CPU 31 judges whether the printing ratio calculated by the printing ratio calculating section 35 exceeds 40% or not (S10). If the printing ratio does not exceed 40%, the CPU 31 judges that the image elongation does not occur. Then, the process proceeds to S7.

If the printing ratio exceeds 40%, the CPU 31 judges that the printing is the two-side printing or the one-side printing (S11, S12). If the printing is the one-side printing, the process proceeds to S13. If the printing is the two-side printing, the process proceeds to S18.

In S13, the CPU 31 selects the sheet rear edge void setting change table of FIG. 8 used for the one-side printing. Then, in reference to the selected sheet rear edge void setting change table, the CPU 31 determines the amount of the rear edge portion to be deleted from the electrostatic latent image, on the basis of the printing ratio calculated by the printing ratio calculating section 35 (S14). For example, if the printing ratio is 90%, the CPU 31 determines that the amount of the rear edge portion to be deleted is 2 mm.

Then, the CPU 31 deletes in accordance with the amount obtained by adding the default amount of the rear edge void and the amount obtained in S14, a region corresponding to the rear edge of the image from the image information (output image data) processed by the image processing section (S15). Then, the electrostatic latent image is formed on the basis of the image information processed as above, and the image is formed on the sheet P (S16). Then, the CPU 31 checks whether there is a next printing operation or not (S17). If there is the next printing operation, the process returns to S4. If there is no next printing operation, the image forming apparatus enters the standby state.

In S18, the CPU 31 selects the sheet rear edge void setting change table of FIG. 7 used for the two-side printing. Then, in reference to the selected sheet rear edge void setting change table, the CPU 31 determines the amount of the rear edge portion to be deleted from the electrostatic latent image, on the basis of the printing ratio calculated by the printing ratio calculating section 35 (S19). For example, if the printing ratio is 90%, the CPU 31 determines that the amount of the rear edge portion to be deleted is 3 mm.

Then, the CPU 31 deletes in accordance with the amount obtained by adding the default amount of the rear edge void and the amount obtained in S19, a region corresponding to the rear edge of the image from the image information (output image data) for both surfaces, the image information being processed by the image processing section (S20). An electrostatic latent image for the first surface is formed by using image information for the first surface in the image information processed as above, and the image is formed on the sheet P (S21). Then, the sheet P is turned over by the switchback conveyance path (S22). After that, an electrostatic latent image for the second surface is formed by using image information for the second surface, and the image is formed on the sheet P (S23). Then, the CPU 31 checks whether there is a next printing operation or not (S24). If there is the next printing operation, the process returns to S4. If there is no next printing operation, the image forming apparatus enters the standby state.

Figure 15:
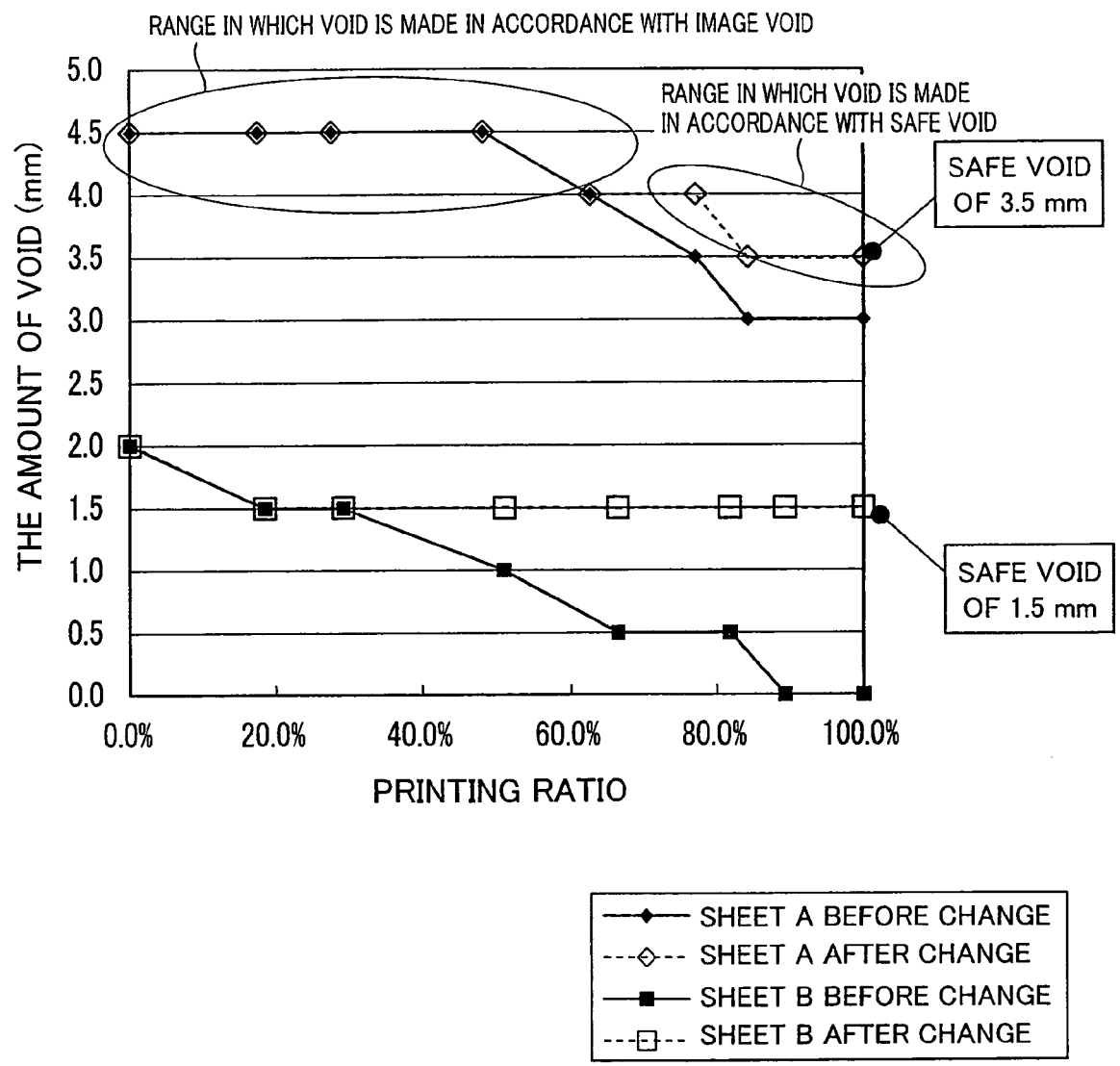
FIG. 15 is an explanatory diagram showing a relation between a printing ratio and the amount of a rear edge void.
Figure 16:
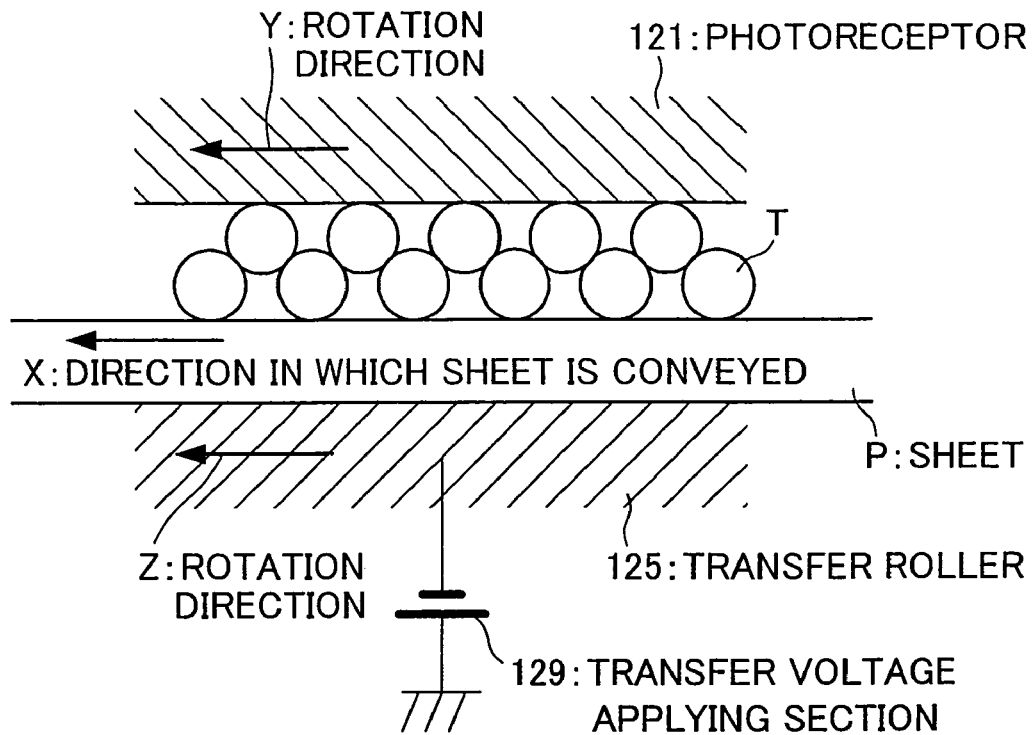
FIGS. 16(a) and 16(b) are explanatory diagrams showing a mechanism of a decrease in an absorptive power between a photoreceptor and a sheet, and the decrease is caused due to a decrease in particle diameter of a toner.
Figure 16:
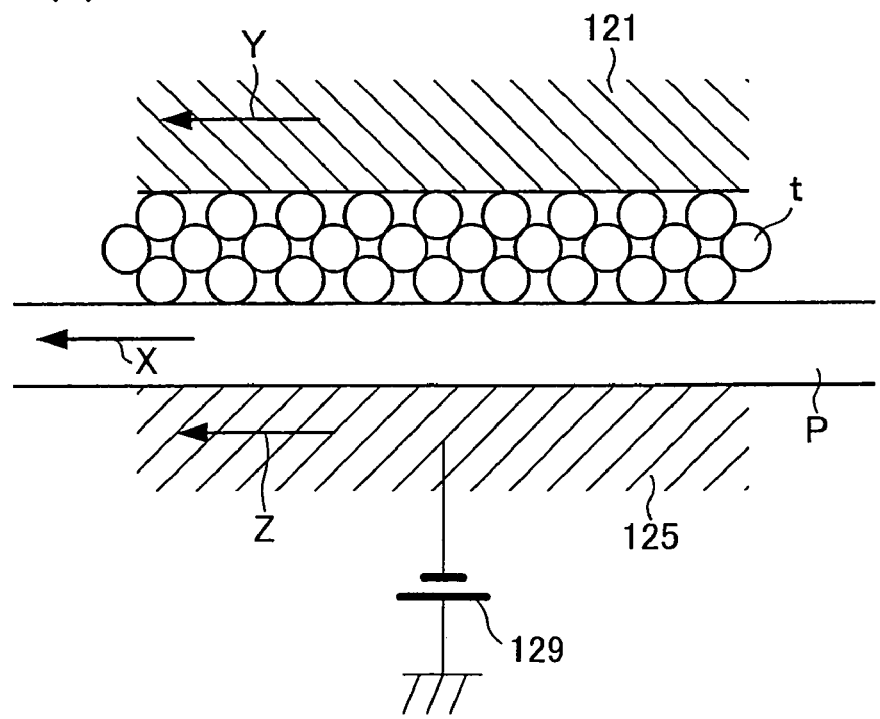
Figure 17:
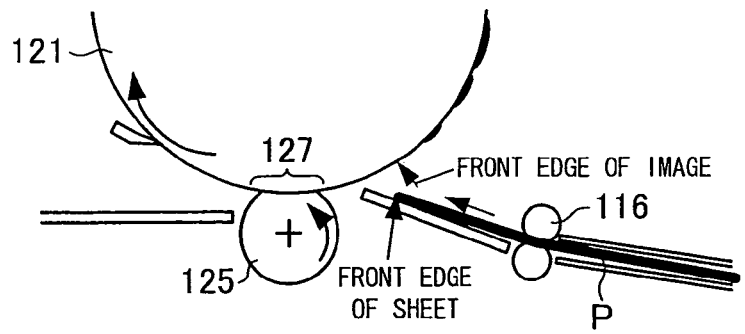
FIGS. 17(a) to 17(d) are explanatory diagrams showing how a sheet is conveyed to a transfer nip portion of a conventional image forming apparatus.
Figure 17:
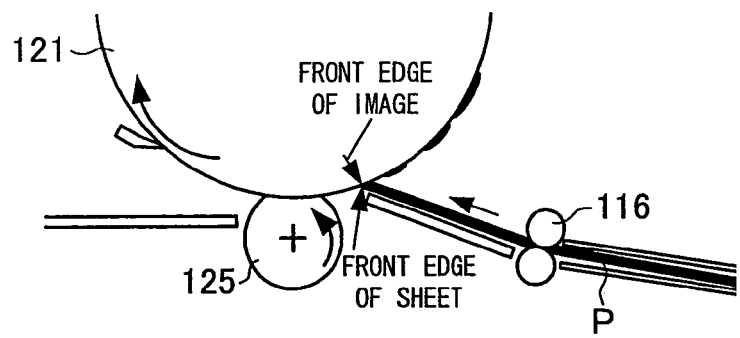
Figure 17:
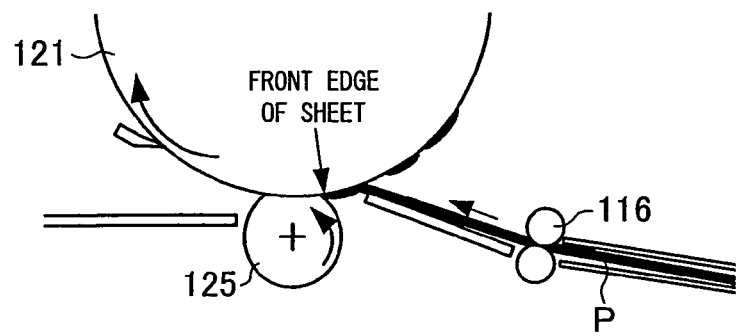
Figure 17:
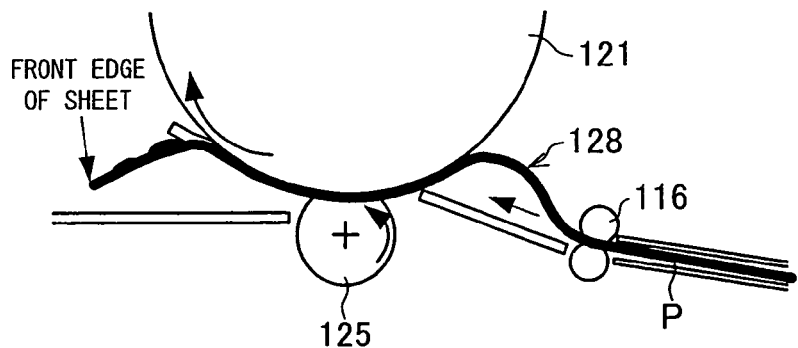

FIG. 15 shows a relation between the printing ratio and the amount of the rear edge void in a sheet A and a relation between the printing ratio and the amount of rear edge void in a sheet B. Note that the sheet A is set so that the default amount of the rear edge void is 4.5 mm and the safe amount of the void that is the minimum amount of the rear edge void is 3.5 mm, and the sheet B is set so that the default amount of the rear edge void is 2.0 mm and the safe amount of the void is 1.5 mm.

In the sheet A, as shown by "SHEET A BEFORE CHANGE" in FIG. 15, the default amount of the rear edge void is secured up to the printing ratio of 50%. If the printing ratio exceeds 50%, the amount of the rear edge void starts decreasing. When the printing ratio is around 77%, the amount of the rear edge void becomes less than the safe amount of the void.

In contrast, as shown by "SHEET A AFTER CHANGE" in FIG. 15, in the image forming apparatus of the present embodiment, when the printing ratio is equal to or more than 60%, the region corresponding to the rear edge of the image information is deleted, and the amount of the rear edge void which amount is not less than the safe amount of the void is forcibly secured.

In the sheet B, as shown by "SHEET B BEFORE CHANGE" in FIG. 15, the amount of the rear edge void becomes less than the safe amount of the void when the printing ratio is 30%. When the printing ratio is 90% or more, the amount of the rear edge void is 0, and the toner image remains on the photoreceptor.

In contrast, as shown by "SHEET B AFTER CHANGE" in FIG. 15, in the image forming apparatus of the present embodiment, when the printing ratio is 30% or more, the region corresponding to the rear edge of the image information is deleted, and the amount of the rear edge void which amount is not less than the safe amount of the void is forcibly secured.

Note that the CPU 31 includes the sheet rear edge void setting change table, and each value in the table is a value to be added to the default amount to obtain the amount of the rear edge void. However, the CPU 31 can include a sheet rear edge void setting table which uses the factor(s) for predicting the occurrence of the image elongation and stores as the amount of the rear edge void a value which takes the image elongation into consideration.

Moreover, each of the image elongation predicting means, the image rear edge adjusting means and the deletion amount setting means in the image forming apparatus may be realized by a hardware logic or, as described in the present embodiment, a software using a CPU.

That is, the present image forming apparatus includes: a CPU (central processing unit) which executes a command of a control program for realizing functions of the image elongation predicting means, the image rear edge adjusting means and the deletion amount setting means; a ROM (read only memory) which stores the program; a RAM (random access memory) which loads the program; a storage device (recording medium), such as a memory, which stores the program and various data; and the like. Then, the image forming apparatus can be realized by supplying a computer-readable recording medium to an image scanner apparatus and then causing its computer (CPU, MPU, or the like) to read out and execute a program code recorded in the recording medium. Note that the computer-readable recording medium records therein the program code (executable format program, intermediate code program, source program) of the control program which realizes the above-described functions. In this case, the program code itself read out from the recording medium realizes the above-described functions, and the recording medium recording the program code is included in the present invention.

Thus, in the present specification, means (section) does not necessarily mean a physical means, that is, the function(s) of each means may be realized by software. Moreover, the function(s) of a single means may be realized by two physical means or more, and the functions of two means or more may be realized by a single physical means.

Note that in the present embodiment, the recording medium may be a memory (not shown) for process steps on a microcomputer. For example, the program medium may be something like a ROM. Alternatively, the program medium may be such that a program reader device (not shown) as an external storage device may be provided in which a storage medium is inserted for reading.

In any case, the stored program may be executable on access by a microprocessor. Further, the program may be retrieved, and the retrieved program may be downloaded to a program storage area (not shown) in a microcomputer to execute the program. The download program is stored in a main body device in advance.

The program medium may be a recording medium constructed separately from a main body. The medium may be (i) tape based, such as a magnetic tape or cassette tape, (ii) disc based, such as a magnetic disc (floppy disc, hard disk, etc.) and an optical disc (CD-ROM, MO, MD, DVD, etc.), (iii) card based, such as an IC card (including a memory card) and an optical card, (iv) or a semiconductor memory, such as a mask ROM, EPROM (Erasable Programmable Read Only Memory), EEPROM (Electrically Erasable Programmable Read Only Memory), and a flash ROM. All these types of media hold the program in a fixed manner.

Moreover, in the present embodiment, since the system is arranged to connect to the Internet or another communication network, the medium may be a storage medium which holds the program in a flowing manner so that the program can be downloaded over the communication network. Note that if the program is downloaded over a communication network in this manner, the download program may be stored in a main body device in advance or installed from another recording medium.

As above, an image forming apparatus of the present invention forms on an electrostatic latent image bearing member an electrostatic latent image based on image information, visualizes the electrostatic latent image by a developer so as to obtain a visible image, and causes a transfer device to transfer the visible image to a recording material at a transfer nip portion while conveying the recording material, and the image forming apparatus includes: image elongation predicting means (image elongation predicting section) for predicting the occurrence of an image elongation, in other words, predicting that, due to slipping of the recording material with respect to the electrostatic latent image bearing member at the transfer nip portion, the visible image transferred is lengthened in a direction in which the recording material is conveyed; and image rear edge adjusting means (image rear edge adjusting section) for deleting a rear edge portion of the electrostatic latent image if said image elongation predicting means predicts the occurrence of the image elongation.

According to the above, the image elongation predicting means predicts the occurrence of the image elongation, that is, predicts that, due to the slipping of the recording material with respect to the electrostatic latent image bearing member at the transfer nip portion, the visible image transferred to the recording material is lengthened in the direction in which the recording material is conveyed. When the image elongation predicting means predicts the occurrence of the image elongation, the image rear edge adjusting means deletes the rear edge portion of the electrostatic latent image.

Therefore, even if the image is lengthened on the recording material when the image is transferred, the image rear edge adjusting means forcibly deletes the rear edge portion of the electrostatic latent image formed on the electrostatic latent image bearing member, on the basis of the prediction by the image elongation predicting means, and the toner image itself is shortened in the direction in which the recording material is conveyed. On this account, the blank space at the rear edge portion of the recording material is secured.

As a result, it is possible to avoid the problems caused due to the reduction or disappearance of the blank space at the rear edge portion of the recording material. The problems are exemplified by (i) the printing stain caused by the remaining developer on the electrostatic latent image bearing member when printing an image on the following sheet(s), (ii) the deterioration in the printing quality (image quality) because of no blank space and (iii) the jam at the fixing section when carrying out the two-side printing adopting the switchback conveyance method.

It is appropriate that the image forming apparatus be configured such that the transfer device includes a transfer roller which is provided in such a manner as to be compressed against the electrostatic latent image bearing member via the recording material, and an electric field whose polarity is opposite to a polarity of an electric charge of the developer is applied to the transfer roller. Moreover, it is appropriate that V1<V2≈V3 (that is, V1<V2=V3 (V3 ranges from 0.99×V2 to 1.012×V2)), where V1 (mm/sec) is a peripheral velocity of the electrostatic latent image bearing member, V2 (mm/sec) is a peripheral velocity of the transfer roller and V3 (mm/sec) is a peripheral velocity of a recording material conveying roller provided in front of the transfer nip portion. Further, it is appropriate that V1×1.005≦V2≈V3≦V1×1.03.

That is, the phenomenon of slipping of the recording material with respect to the electrostatic latent image bearing member easily occurs in the case in which the configuration of the transfer device, and the peripheral velocities of the electrostatic latent image bearing member, the transfer roller and the recording material conveying roller are as above. Therefore, in such a case, it is more effective to adopt the present invention. Further, it is appropriate that the present invention be applied to a case in which the average particle diameter of a developer to be used is equal to or less than 7 Φμm (the diameter of the large particle is less than 10 Φμm).

The image forming apparatus of the present invention can be configured so as to further include: deletion amount setting means (deletion amount setting section) for setting the amount of the rear edge portion to be deleted from the electrostatic latent image, the amount being set in accordance with the amount of the visible image lengthened due to the image elongation; and the image rear edge adjusting means deleting the rear edge portion of the electrostatic latent image on the basis of the amount of the rear edge portion to be deleted, the amount being set by the deletion amount setting means.

According to the above, the deletion amount setting means sets the amount of the rear edge portion to be deleted from the electrostatic latent image, the amount being set in accordance with the amount of the visible image lengthened due to the image elongation, and the image rear edge adjusting means deletes the rear edge portion of the electrostatic latent image on the basis of the amount set by the deletion amount setting means.

Therefore, the amount of the rear edge portion to be deleted from the electrostatic latent image by the rear edge adjusting means is the amount set by the deletion amount setting means, that is, the amount determined in accordance with the amount of the visible image lengthened due to the image elongation. On this account, the blank space at the rear edge of the recording material can have a predetermined size as if no image elongation had occurred.

As a result, it is possible to appropriately avoid the problems caused due to the reduction or disappearance of the blank space at the rear edge portion of the recording material. In addition, it is possible to further improve the print quality.

The deletion amount setting means can be easily realized by, for example, including a table in which the amount of the rear edge portion to be deleted is set in accordance with a combination of factors for setting the amount of the rear edge portion to be deleted.

The image forming apparatus of the present invention can be configured so that as one of factors for predicting the occurrence of the image elongation or as one of factors for setting the amount of the rear edge portion to be deleted, the image elongation predicting means or the deletion amount setting means uses a length of the recording material in the direction in which the recording material is conveyed.

The occurrence of the image elongation and the amount of the image lengthened due to the image elongation relate to the length of the recording material in the direction in which the recording material is conveyed. Thus, by using the length of the recording material in the direction in which the recording material is conveyed, as a factor for predicting the occurrence of the image elongation or as a factor for setting the amount of the rear edge portion to be deleted, it is possible to accurately predict the occurrence of the image elongation and also possible to appropriately set the amount of the rear edge portion to be deleted, the amount being set in accordance with the amount of the image lengthened.

Moreover, the image forming apparatus of the present invention can be configured so that as one of factors for predicting the occurrence of the image elongation or as one of factors for setting the amount of the rear edge portion to be deleted, the image elongation predicting means or the deletion amount setting means uses a printing ratio of a predetermined region (i) which is in the recording material to which the visible image is transferred and (ii) which is determined in accordance with the length of the recording material in the direction in which the recording material is conveyed.

The occurrence of the image elongation and the amount of the image lengthened due to the image elongation relate to the printing ratio of the predetermined region (i) which is in the recording material to which the visible image is transferred and (ii) which is determined in accordance with the length of the recording material in the direction in which the recording material is conveyed. Therefore, by using the printing ratio of the predetermined region as a factor for predicting the occurrence of the image elongation or as a factor for setting the amount of the rear edge portion to be deleted, it is possible to accurately predict the occurrence of the image elongation and also possible to appropriately set the amount of the rear edge portion to be deleted, the amount being set in accordance with the amount of the image lengthened.

The predetermined region determined in accordance with the length of the recording material can be (i) a region obtained by at least omitting from an entire region of the recording material a first region which passes through the transfer nip section in a state in which the recording material is not in a recording material conveying roller, (ii) a region obtained by at least omitting from the entire region of the recording material a second region which passes through the transfer nip section in a state in which a bended portion of the recording material is not completely formed in front of the transfer nip portion, or (iii) a region obtained by omitting from the entire region of the recording material the above first and second regions.

The image forming apparatus of the present invention can be configured so that as one of factors for predicting the occurrence of the image elongation or as one of factors for setting the amount of the rear edge portion to be deleted, the image elongation predicting means or the deletion amount setting means uses (i) a thickness of the recording material to which the visible image is transferred, (ii) a surface smoothness of the recording material to which the visible image is transferred, or (iii) the apparatus internal environment information which includes at least information of a humidity in the image forming apparatus.

The occurrence of the image elongation and the amount of the image lengthened due to the image elongation relate to (i) the thickness of the recording material to which the visible image is transferred, (ii) the surface smoothness of the recording material to which the visible image is transferred, and (iii) the apparatus internal environment information which includes at least information of a humidity in the image forming apparatus. Therefore, by using (i) the thickness of the recording material, (ii) the surface smoothness of the recording material, or (iii) the apparatus internal environment information as a factor for predicting the occurrence of the image elongation or as a factor for setting the amount of the rear edge portion to be deleted, it is possible to accurately predict the occurrence of the image elongation and also possible to appropriately set the amount of the rear edge portion to be deleted, the amount being set in accordance with the amount of the image lengthened.

The image forming apparatus of the present invention can be configured so that between a case in which an image is formed on only one side of the recording material and a case in which an image is formed on both sides of the recording material, the deletion amount setting means changes the amount of the rear edge portion to be deleted. In such a case, for example, it is preferable that the deletion amount setting means carry out setting so that the amount of the rear edge portion to be deleted when forming images on both sides of the recording material is larger than the amount of the rear edge portion to be deleted when forming an image on only one side of the recording material.

The reduction or disappearance of the blank space at the rear edge portion of the recording material when carrying out the two-side printing causes the reduction or disappearance of the front edge portion of the recording material when carrying out printing with respect to the second surface of the recording material conveyed by the switchback conveyance. This further causes the jam of the recording material at the fixing section. However, for example, by setting the amount of the rear edge portion to be deleted when carrying out the two-side printing which amount is larger than the amount of the rear edge portion to be deleted when carrying out the one-side printing, it is possible to surely avoid the jam at the fixing section.

Unlike when carrying out the two-side printing, it is not necessary to consider the jam at the fixing section 3 when carrying out the one-side printing. Therefore, by setting the amount of the blank space at the rear edge portion of the recording material to be the minimum amount (that is, such amount that the developer does not remain on the electrostatic latent image bearing member), it is possible to minimize the amount of the rear edge portion that is forcibly deleted from the electrostatic latent image, and also possible to secure the amount of information expressed on the recording material.

The image forming apparatus of the present invention can be configured so that the deletion amount setting means carries out setting so that, when forming images on both sides of the recording material, the amount of the rear edge portion to be deleted from one side of the recording material is equal to the amount of the rear edge portion to be deleted from another side of the recording material. With this, the positions of the images on the above-described one side and on the above-described another side are identical with each other when carrying out the two-side printing. On this account, it is possible to improve the printing quality more than a case in which the positions of the images are different between the first surface and the second surface.

As above, a program for controlling the image forming apparatus of the present invention is a control program for causing a computer to execute the above-described image elongation predicting means, deletion amount setting means and image rear edge adjusting means in the image forming apparatus of the present invention. Therefore, it is possible to cause a computer to realize the image forming apparatus of the present invention which apparatus can appropriately avoid the problems caused due to the reduction or disappearance of the blank space at the rear edge portion of the recording material. The problems are exemplified by (i) the printing stain caused by the remaining developer on the electrostatic latent image bearing member when printing an image on the following sheet(s), (ii) the deterioration in the printing quality (image quality) because of no blank space and (iii) the jam at the fixing section when carrying out the two-side printing adopting the switchback conveyance method. On this account, the image forming apparatus can be general-purpose.

As above, a recording medium of the present invention is a computer-readable recording medium which records the control program of the image forming apparatus of the present invention. Therefore, it is possible to easily supply to a computer the control program of the image forming apparatus of the present invention which apparatus can appropriately avoid the problems caused due to the reduction or disappearance of the blank space at the rear edge portion of the recording material. The problems are exemplified by (i) the printing stain caused by the remaining developer on the electrostatic latent image bearing member when printing an image on the following sheet(s), (ii) the deterioration in the printing quality (image quality) because of no blank space and (iii) the jam at the fixing section when carrying out the two-side printing adopting the switchback conveyance method.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. An image forming apparatus which forms on an electrostatic latent image bearing member an electrostatic latent image based on image information, visualizes the electrostatic latent image by a developer so as to obtain a visible image, and causes a transfer device to transfer the visible image to a recording material at a transfer nip portion while conveying the recording material, the image forming apparatus comprising:
    image elongation predicting means for predicting the occurrence of an image elongation, in other words, predicting that, due to slipping of the recording material with respect to the electrostatic latent image bearing member at the transfer nip portion, the visible image transferred is lengthened in a direction in which the recording material is conveyed; and
    image rear edge adjusting means for deleting a rear edge portion of the electrostatic latent image if said image elongation predicting means predicts the occurrence of the image elongation.

2. The image forming apparatus as set forth in claim 1, wherein:
    the transfer device includes a transfer roller which is provided in such a manner as to be compressed against the electrostatic latent image bearing member via the recording material; and
    an electric field whose polarity is opposite to a polarity of an electric charge of the developer is applied to the transfer roller.

3. The image forming apparatus as set forth in claim 2, wherein $$V1 < V2 = V3,$$

where V1 (mm/sec) is a peripheral velocity of the electrostatic latent image bearing member, V2 (mm/sec) is a peripheral velocity of the transfer roller and V3 (mm/sec) is a peripheral velocity of a recording material conveying roller provided in front of the transfer nip portion, and said V3 ranging from 0.99×V2 to 1.012×V2.

4. The image forming apparatus as set forth in claim 3, wherein $$V1 \times 1.005 \leq V2 = V3 \leq V1 \times 1.03.$$

5. The image forming apparatus as set forth in claim 1, further comprising:

deletion amount setting means for setting the amount of the rear edge portion to be deleted from the electrostatic latent image, the amount being set in accordance with the amount of the visible image lengthened due to the image elongation; and said image rear edge adjusting means deleting the rear edge portion of the electrostatic latent image on the basis of the amount of the rear edge portion to be deleted, the amount being set by said deletion amount setting means.

6. The image forming apparatus as set forth in claim 5, wherein between a case in which an image is formed on only one side of the recording material and a case in which an image is formed on both sides of the recording material, said deletion amount setting means changes the amount of the rear edge portion to be deleted.

7. The image forming apparatus as set forth in claim 5, wherein said deletion amount setting means carries out setting so that the amount of the rear edge portion to be deleted when forming images on both sides of the recording material is larger than the amount of the rear edge portion to be deleted when forming an image on only one side of the recording material.

8. The image forming apparatus as set forth in claim 5, wherein said deletion amount setting means carries out setting so that, when forming images on both sides of the recording material, the amount of the rear edge portion to be deleted from one side of the recording material is equal to the amount of the rear edge portion to be deleted from another side of the recording material.

9. The image forming apparatus as set forth in claim 5, wherein said deletion amount setting means uses a table in which the amount of the rear edge portion to be deleted is set in accordance with a combination of factors for setting the amount of the rear edge portion to be deleted.

10. The image forming apparatus as set forth in claim 1, wherein as one of factors for predicting the occurrence of the image elongation or as one of factors for setting the amount of the rear edge portion to be deleted, said image elongation predicting means or said deletion amount setting means uses a length of the recording material in the direction in which the recording material is conveyed.

11. The image forming apparatus as set forth in claim 1, wherein as one of factors for predicting the occurrence of the image elongation or as one of factors for setting the amount of the rear edge portion to be deleted, said image elongation predicting means or said deletion amount setting means uses a printing ratio of a predetermined region (i) which is in the recording material to which the visible image is transferred and (ii) which is determined in accordance with a length of the recording material in the direction in which the recording material is conveyed.

12. The image forming apparatus as set forth in claim 11, wherein the predetermined region determined in accordance with the length of the recording material is a region obtained by at least omitting from an entire region of the recording material a region which passes through the transfer nip section in a state in which the recording material is not in a recording material conveying roller.

13. The image forming apparatus as set forth in claim 11, wherein the predetermined region determined in accordance with the length of the recording material is a region obtained by at least omitting from an entire region of the recording material a region which passes through the transfer nip section in a state in which a bended portion of the recording material is not completely formed in front of the transfer nip portion.

14. The image forming apparatus as set forth in claim 1, wherein as one of factors for predicting the occurrence of the image elongation or as one of factors for setting the amount of the rear edge portion to be deleted, said image elongation predicting means or said deletion amount setting means uses a thickness of the recording material to which the visible image is transferred.

15. The image forming apparatus as set forth in claim 1, wherein as one of factors for predicting the occurrence of the image elongation or as one of factors for setting the amount of the rear edge portion to be deleted, said image elongation predicting means or said deletion amount setting means uses a surface smoothness of the recording material to which the visible image is transferred.

16. The image forming apparatus as set forth in claim 1, wherein as one of factors for predicting the occurrence of the image elongation or as one of factors for setting the amount of the rear edge portion to be deleted, said image elongation predicting means or said deletion amount setting means uses an apparatus internal environment information which includes at least information of a humidity in the image forming apparatus.

17. A computer-readable recording medium recording a program for controlling an image forming apparatus which forms on an electrostatic latent image bearing member an electrostatic latent image based on image information, visualizes the electrostatic latent image by a developer so as to obtain a visible image, and causes a transfer device to transfer the visible image to a recording material at a transfer nip portion while conveying the recording material, wherein the program, when executed by a computer, predicts the occurrence of an image elongation, in other words, predicts that, due to slipping of the recording material with respect to the electrostatic latent image bearing member at the transfer nip portion, the visible image transferred is lengthened in a direction in which the recording material is conveyed; and causes a rear edge portion of the electrostatic latent image to be deleted if the image elongation is predicted.

18. A computer-readable recording medium recording a program for controlling an image forming apparatus which forms on an electrostatic latent image bearing member an electrostatic latent image based on image information, visualizes the electrostatic latent image by a developer so as to obtain a visible image, and causes a transfer device to transfer the visible image to a recording material at a transfer nip portion while conveying the recording material, wherein the program, when executed by a computer, predicts the occurrence of an image elongation, in other words, predicts that, due to slipping of the recording material with respect to the electrostatic latent image bearing member at the transfer nip portion, the visible image transferred is lengthened in a direction in which the recording material is conveyed; sets the amount of a rear edge portion to be deleted from the electrostatic latent image, the amount being set in accordance with the amount of the visible image lengthened due to the image elongation; and causes the rear edge portion of the electrostatic latent image to be deleted if the image elongation is predicted.

* * * * *